US012675840B2

(12) United States Patent
Jung et al.

(10) Patent No.: US 12,675,840 B2
(45) **Date of Patent: \*Jul. 7, 2026**

(54) LATE WARPING TO MINIMIZE LATENCY OF MOVING OBJECTS

(71) Applicant: Snap Inc., Santa Monica, CA (US)

(72) Inventors: Bernhard Jung, Perchtoldsdorf (AT); Daniel Wagner, Vienna (AT)

(73) Assignee: SNAP INC., Santa Monica, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/768,841

(22) Filed: Jul. 10, 2024

(65) Prior Publication Data

US 2024/0362743 A1     Oct. 31, 2024

Related U.S. Application Data

(63) Continuation of application No. 17/518,828, filed on Nov. 4, 2021, now Pat. No. 12,067,693.

(Continued)

(51) Int. Cl.
*G06T 3/18* (2024.01)
*G06T 13/40* (2011.01)
(Continued)

(52) U.S. Cl.
CPC ................ *G06T 3/18* (2024.01); *G06T 13/40* (2013.01); *G06T 13/80* (2013.01); *G06T 15/205* (2013.01); *G06T 2210/44* (2013.01)

(58) Field of Classification Search
CPC ........... G06T 3/18; G06T 13/40; G06T 13/80; G06T 15/205; G06T 2210/44;
(Continued)

(56) References Cited

U.S. PATENT DOCUMENTS 10,078,917 B1 * 9/2018 Gaeta .................. G06F 3/04815
10,762,598 B2 * 9/2020 Liebenow ............ G06T 19/006
(Continued)

FOREIGN PATENT DOCUMENTS

CN      108139815       6/2018
CN      117321472 A     12/2023
(Continued)

OTHER PUBLICATIONS

"Korean Application Serial No. 10-2023-7043444, Response filed Jul. 19, 2024 to Notice of Preliminary Rejection mailed May 21, 2024", w English claims, 19 pgs.
(Continued)

*Primary Examiner* — Michael Le
(74) *Attorney, Agent, or Firm* — SCHWEGMAN LUNDBERG & WOESSNER, P.A.

(57) ABSTRACT

A method for minimizing latency of moving objects in an augmented reality (AR) display device is described. In one aspect, the method includes determining an initial pose of a visual tracking device, identifying an initial location of an object in an image that is generated by an optical sensor of the visual tracking device, the image corresponding to the initial pose of the visual tracking device. rendering virtual content based on the initial pose and the initial location of the object, retrieving an updated pose of the visual tracking device, tracking an updated location of the object in an updated image that corresponds to the updated pose, and applying a time warp transformation to the rendered virtual content based on the updated pose and the updated location of the object to generate transformed virtual content.

20 Claims, 13 Drawing Sheets

Related U.S. Application Data

(60) Provisional application No. 63/190,119, filed on May 18, 2021.

(51) Int. Cl.
G06T 13/80 (2011.01)
G06T 15/20 (2011.01)

(58) Field of Classification Search
CPC ... G06F 3/011; G06F 3/14; G02B 2027/0187; G02B 27/0172; G09G 2340/125; G09G 2340/14; G09G 5/377
See application file for complete search history.

(56) References Cited

U.S. PATENT DOCUMENTS

| | | | | |
|---|---|---|---|---|
| 10,984,574 | B1 | 4/2021 | De Ridder et al. | |
| 12,067,693 | B2 | 8/2024 | Jung et al. | |
| 2015/0138233 | A1 | 5/2015 | Frushour et al. | |
| 2017/0243324 | A1* | 8/2017 | Mierle | G06T 15/005 |
| 2017/0345220 | A1* | 11/2017 | Bates | H04N 13/383 |
| 2018/0061121 | A1* | 3/2018 | Yeoh | G06F 3/04815 |
| 2018/0190017 | A1* | 7/2018 | Mendez | G06T 17/20 |
| 2018/0261012 | A1 | 9/2018 | Mullins et al. | |
| 2018/0268519 | A1* | 9/2018 | Liebenow | G06T 19/006 |
| 2019/0230588 | A1* | 7/2019 | Kim | H04W 48/20 |
| 2020/0027194 | A1 | 1/2020 | Nourai et al. | |
| 2020/0050264 | A1* | 2/2020 | Kruzel | G06T 11/00 |
| 2020/0134927 | A1 | 4/2020 | Huang et al. | |
| 2020/0279432 | A1 | 9/2020 | Yeoh et al. | |
| 2020/0410740 | A1 | 12/2020 | Croxford et al. | |
| 2021/0005002 | A1 | 1/2021 | Barragan et al. | |
| 2021/0256751 | A1* | 8/2021 | De Ridder | G06T 13/20 |
| 2021/0262800 | A1* | 8/2021 | Levine | G06F 3/012 |
| 2022/0375026 | A1 | 11/2022 | Jung et al. | |

FOREIGN PATENT DOCUMENTS

| | | |
|---|---|---|
| KR | 20150130555 | 11/2015 |
| KR | 20180121994 | 11/2018 |
| WO | WO-2022246384 A1 | 11/2022 |

OTHER PUBLICATIONS

"Korean Application Serial No. 10-2023-7043444, Voluntary Amendment filed May 7, 2024", w English claims, 22 pgs.
"U.S. Appl. No. 17/518,828, Final Office Action mailed Aug. 23, 2023", 23 pgs.
"U.S. Appl. No. 17/518,828, Non Final Office Action mailed Jan. 13, 2023", 21 pgs.
"U.S. Appl. No. 17/518,828, Non Final Office Action mailed Nov. 22, 2023", 25 pgs.
"U.S. Appl. No. 17/518,828, Notice of Allowance mailed Apr. 12, 2024", 11 pgs.
"U.S. Appl. No. 17/518,828, Response filed Feb. 22, 2024 to Non Final Office Action mailed Nov. 22, 2023", 13 pgs.
"U.S. Appl. No. 17/518,828, Response filed May 15, 2023 to Non Final Office Action mailed Jan. 13, 2023", 15 pgs.
"U.S. Appl. No. 17/518,828, Response filed Nov. 8, 2023 to Final Office Action mailed Aug. 23, 2023", 12 pgs.
"International Application Serial No. PCT/US2022/072341, International Preliminary Report on Patentability mailed Nov. 30, 2023", 8 pgs.
"International Application Serial No. PCT/US2022/072341, International Search Report mailed Sep. 20, 2022", 4 pgs.
"International Application Serial No. PCT/US2022/072341, Written Opinion mailed Sep. 20, 2022", 4 pgs.
"Korean Application Serial No. 10-2023-7043444, Notice of Preliminary Rejection mailed May 21, 2024", w/ English Translation, 5 pgs.
"Chinese Application Serial No. 202280036131.8, Notification of the First Office Action mailed Apr. 29, 2026", w/ English translation, 25 pgs.

* cited by examiner

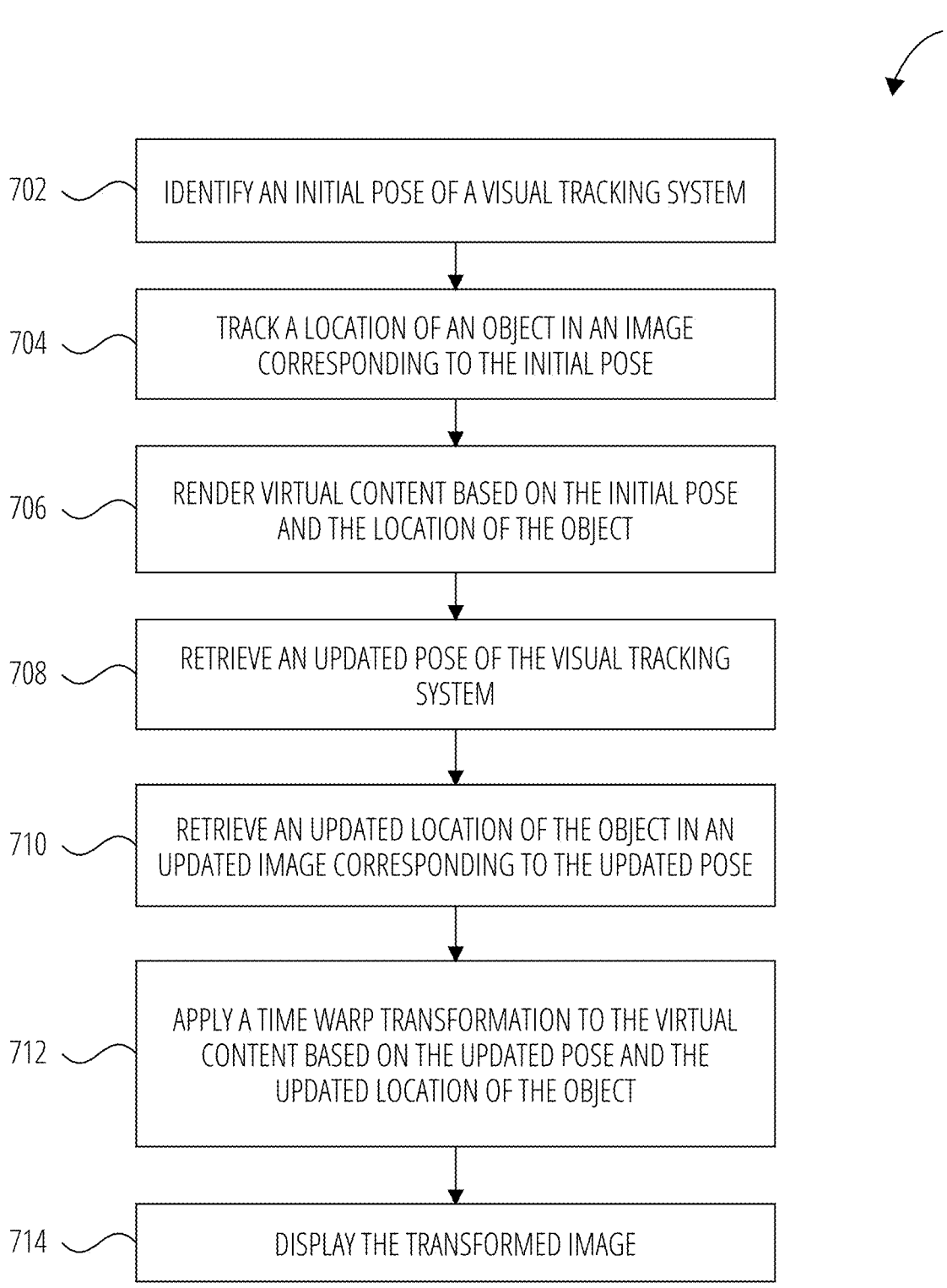

702 — IDENTIFY AN INITIAL POSE OF A VISUAL TRACKING SYSTEM

704 — TRACK A LOCATION OF AN OBJECT IN AN IMAGE CORRESPONDING TO THE INITIAL POSE

706 — RENDER VIRTUAL CONTENT BASED ON THE INITIAL POSE AND THE LOCATION OF THE OBJECT

708 — RETRIEVE AN UPDATED POSE OF THE VISUAL TRACKING SYSTEM

710 — RETRIEVE AN UPDATED LOCATION OF THE OBJECT IN AN UPDATED IMAGE CORRESPONDING TO THE UPDATED POSE

712 — APPLY A TIME WARP TRANSFORMATION TO THE VIRTUAL CONTENT BASED ON THE UPDATED POSE AND THE UPDATED LOCATION OF THE OBJECT

714 — DISPLAY THE TRANSFORMED IMAGE

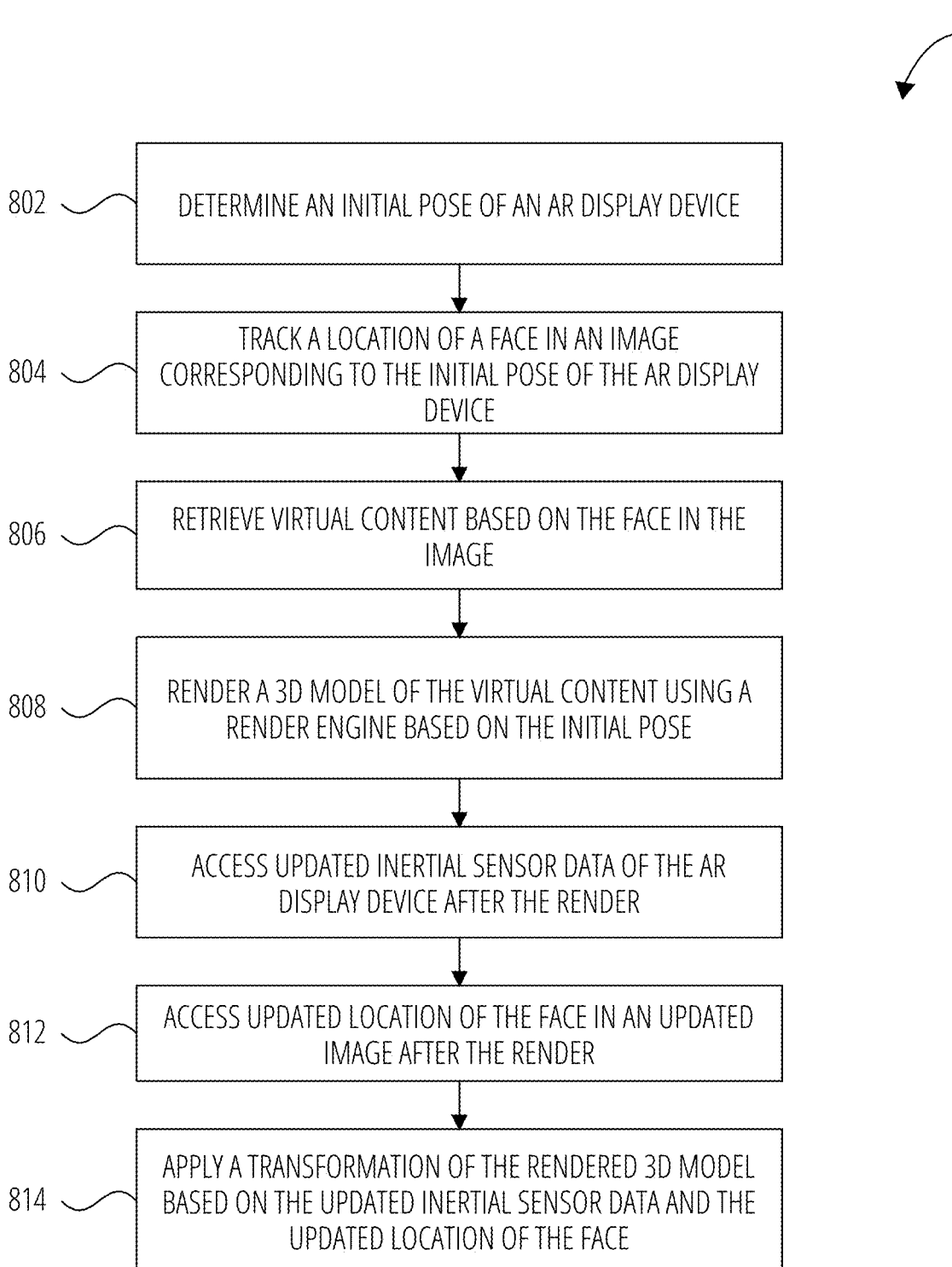

800

802 — DETERMINE AN INITIAL POSE OF AN AR DISPLAY DEVICE

804 — TRACK A LOCATION OF A FACE IN AN IMAGE CORRESPONDING TO THE INITIAL POSE OF THE AR DISPLAY DEVICE

806 — RETRIEVE VIRTUAL CONTENT BASED ON THE FACE IN THE IMAGE

808 — RENDER A 3D MODEL OF THE VIRTUAL CONTENT USING A RENDER ENGINE BASED ON THE INITIAL POSE

810 — ACCESS UPDATED INERTIAL SENSOR DATA OF THE AR DISPLAY DEVICE AFTER THE RENDER

812 — ACCESS UPDATED LOCATION OF THE FACE IN AN UPDATED IMAGE AFTER THE RENDER

814 — APPLY A TRANSFORMATION OF THE RENDERED 3D MODEL BASED ON THE UPDATED INERTIAL SENSOR DATA AND THE UPDATED LOCATION OF THE FACE

FIG. 8

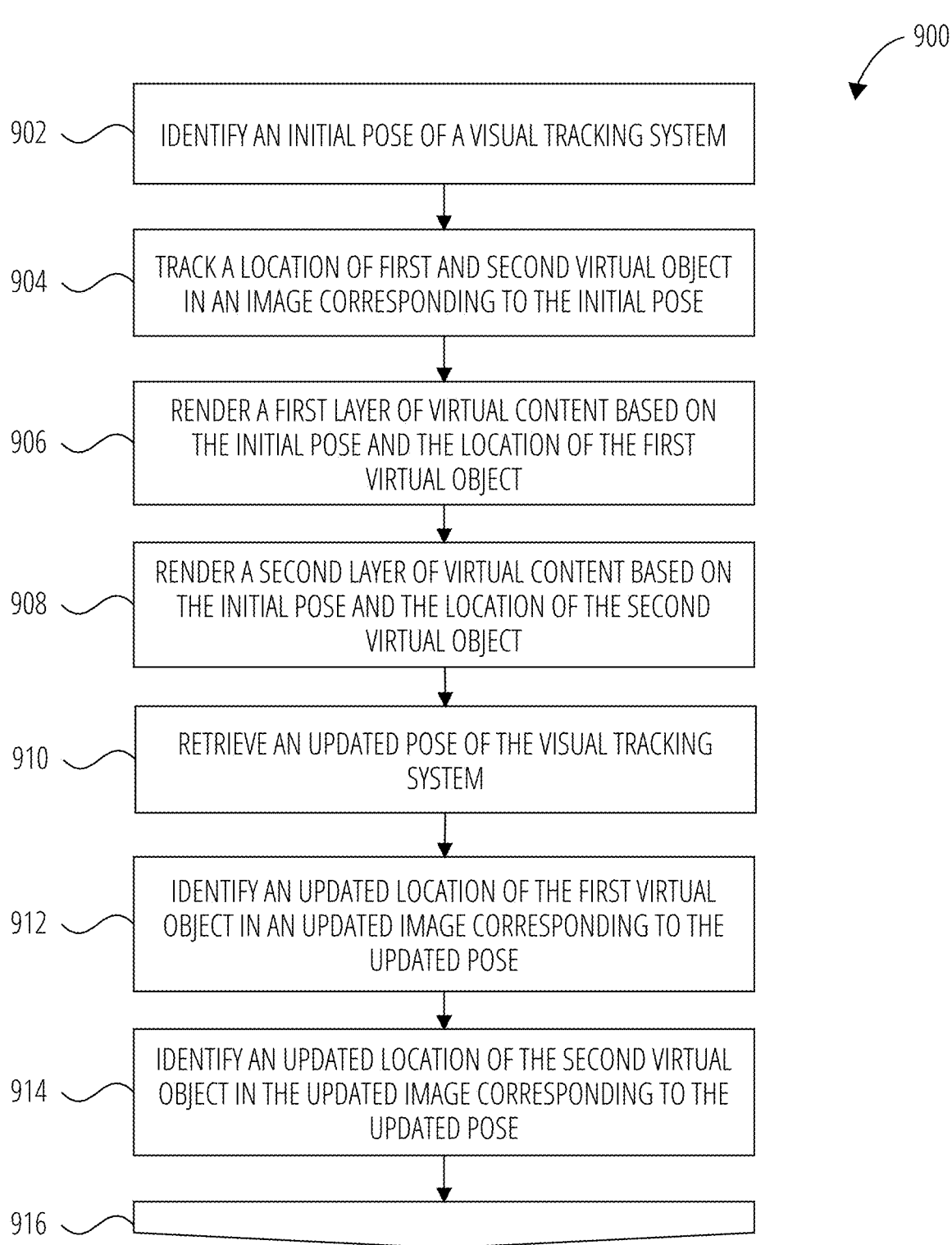

900

902 — IDENTIFY AN INITIAL POSE OF A VISUAL TRACKING SYSTEM

904 — TRACK A LOCATION OF FIRST AND SECOND VIRTUAL OBJECT IN AN IMAGE CORRESPONDING TO THE INITIAL POSE

906 — RENDER A FIRST LAYER OF VIRTUAL CONTENT BASED ON THE INITIAL POSE AND THE LOCATION OF THE FIRST VIRTUAL OBJECT

908 — RENDER A SECOND LAYER OF VIRTUAL CONTENT BASED ON THE INITIAL POSE AND THE LOCATION OF THE SECOND VIRTUAL OBJECT

910 — RETRIEVE AN UPDATED POSE OF THE VISUAL TRACKING SYSTEM

912 — IDENTIFY AN UPDATED LOCATION OF THE FIRST VIRTUAL OBJECT IN AN UPDATED IMAGE CORRESPONDING TO THE UPDATED POSE

914 — IDENTIFY AN UPDATED LOCATION OF THE SECOND VIRTUAL OBJECT IN THE UPDATED IMAGE CORRESPONDING TO THE UPDATED POSE

1000

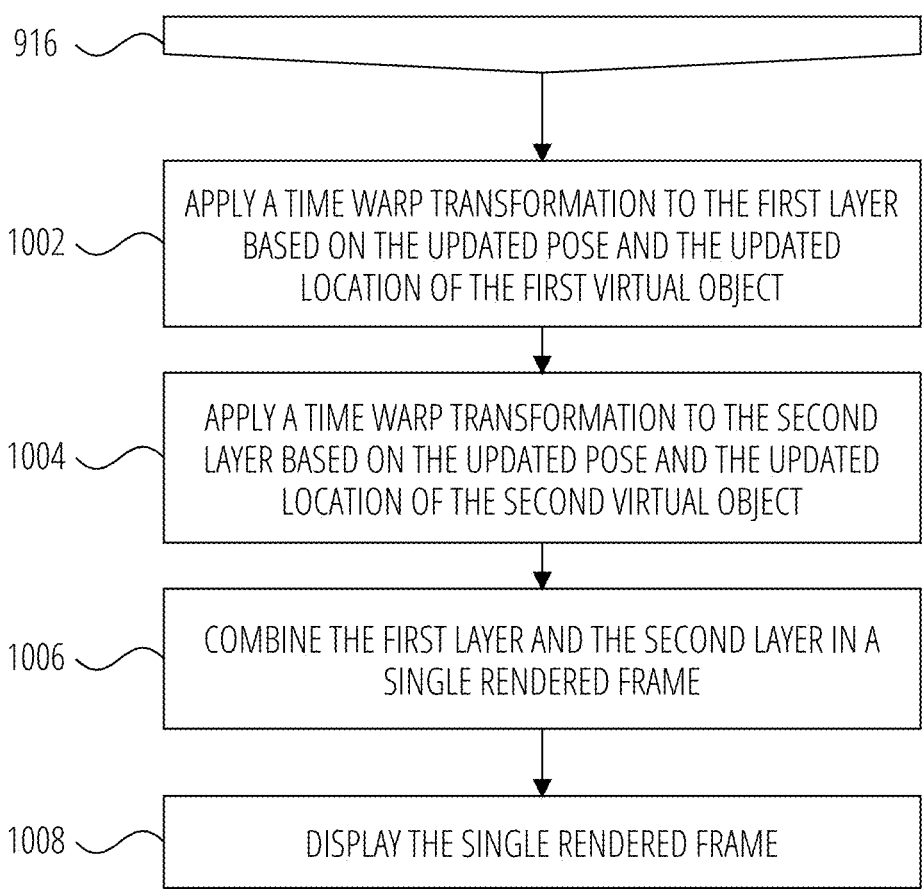

916

| 1002 | APPLY A TIME WARP TRANSFORMATION TO THE FIRST LAYER BASED ON THE UPDATED POSE AND THE UPDATED LOCATION OF THE FIRST VIRTUAL OBJECT |

| 1004 | APPLY A TIME WARP TRANSFORMATION TO THE SECOND LAYER BASED ON THE UPDATED POSE AND THE UPDATED LOCATION OF THE SECOND VIRTUAL OBJECT |

| 1006 | COMBINE THE FIRST LAYER AND THE SECOND LAYER IN A SINGLE RENDERED FRAME |

| 1008 | DISPLAY THE SINGLE RENDERED FRAME |

FIG. 10

LATE WARPING TO MINIMIZE LATENCY OF MOVING OBJECTS

RELATED APPLICATION

The present application is a continuation of U.S. patent application Ser. No. 17/518,828, filed May 18, 2021, which claims priority to U.S. Provisional Patent Application Ser. No. 63/190,119, filed May 18, 2021, each of which are hereby incorporated by reference in their entirety.

TECHNICAL FIELD

The subject matter disclosed herein generally relates to a display system. Specifically, the present disclosure addresses systems and methods for reducing motion-to-photon latency in augmented reality (AR) devices.

BACKGROUND

Augmented reality (AR) systems present virtual content to augment a user's real world environment. For example, virtual content overlaid over a physical object can be used to create the illusion that the physical object is moving, animated, etc. An AR device worn by a user continuously updates presentation of the virtual content based on the user's movements to create the illusion that the virtual content is physically present in the user's real world environment. For example, as the user moves their head, the AR device updates presentation of the virtual content to create the illusion that the virtual content remains in the same geographic position within the user's real world environment. Accordingly, a user may move around a virtual object presented by the AR device in the same way the user would around a physical object.

To convincingly create the illusion that the virtual object is in the user's real world environment, the AR device has to update presentation of the virtual object almost instantaneously on movement of the device. However, virtual content can take a longer time to be updated because the AR device has to process the environmental data, render the virtual content, and then project the virtual content. This process creates a latency between the time a physical object is tracked by the AR device to the time a rendered virtual object is displayed in a display of the AR device. This latency is also referred to as "motion-to-photon latency." Any perceivable motion-to-photon latency diminishes the user's experience.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

FIG. 7 is a flow diagram illustrating a method for applying a time-warping process in accordance with one example embodiment.

FIG. 8 is a flow diagram illustrating a method for applying a time-warping process in accordance with one example embodiment.

FIG. 9 is a flow diagram illustrating a method for applying a time-warping process in accordance with one example embodiment.

FIG. 10 is a flow diagram illustrating a method for applying a time-warping process in accordance with one example embodiment.

DETAILED DESCRIPTION

Figure 1:
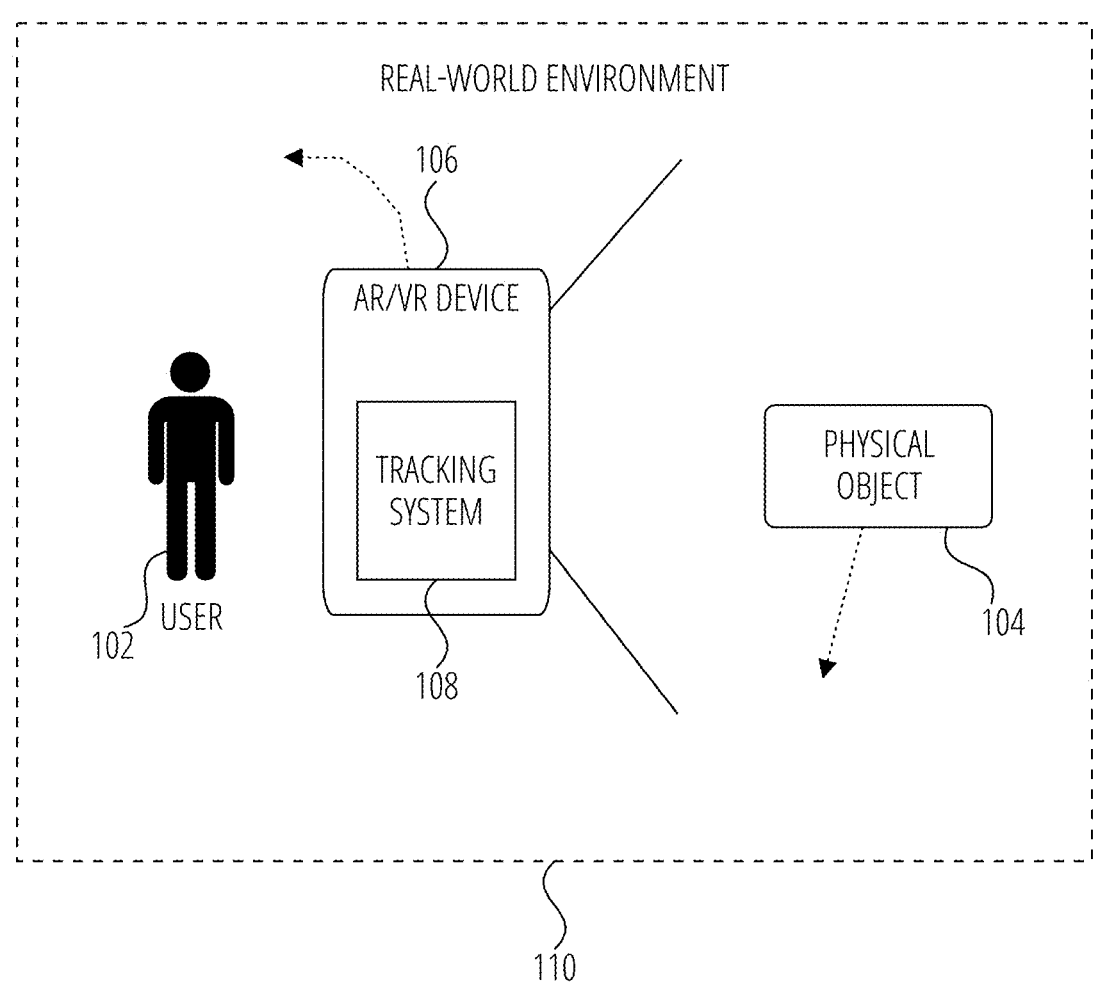
FIG. 1 is a block diagram illustrating an environment for operating an AR/VR display device in accordance with one example embodiment.

The description that follows describes systems, methods, techniques, instruction sequences, and computing machine program products that illustrate example embodiments of the present subject matter. In the following description, for purposes of explanation, numerous specific details are set forth in order to provide an understanding of various embodiments of the present subject matter. It will be evident, however, to those skilled in the art, that embodiments of the present subject matter may be practiced without some or other of these specific details. Examples merely typify possible variations. Unless explicitly stated otherwise, structures (e.g., structural Components, such as modules) are optional and may be combined or subdivided, and operations (e.g., in a procedure, algorithm, or other function) may vary in sequence or be combined or subdivided.

The term "augmented reality" (AR) is used herein to refer to an interactive experience of a real-world environment where physical objects that reside in the real-world are "augmented" or enhanced by computer-generated digital content (also referred to as virtual content or synthetic content). AR can also refer to a system that enables a combination of real and virtual worlds, real-time interaction, and 3D registration of virtual and real objects. AR creates the illusion that the virtual content is physically present in the user's real world environment, and appear to be attached or interact with the user's real-world environment.

The term "virtual reality" (VR) is used herein to refer to a simulation experience of a virtual world environment that is completely distinct from the real-world environment. Computer-generated digital content is displayed in the virtual world environment. VR also refers to a system that enables a user of a VR system to be completely immersed in the virtual world environment and to interact with virtual objects presented in the virtual world environment.

The term "AR application" is used herein to refer to a computer-operated application that enables an AR experience. The term "VR application" is used herein to refer to a computer-operated application that enables a VR experience. The term "AR/VR application" refers to a computer-operated application that enables a combination of an AR experience or a VR experience.

The term "AR display device" (also referred to as "AR device") is used herein to refer to a computing device operating an AR application. The term "VR display device" (also referred to as "VR device") is used herein to refer to a computing device operating a VR application. The term "AR/VR display device" (also referred to as "AR/VR device") is used herein to refer to a computing device operating a combination of the AR application and the VR application.

The term "visual tracking system" (also referred to as a "visual tracking device") is used herein to refer to a computer-operated application that tracks visual features identified in images captured by one or more cameras of the visual tracking system. The visual tracking system builds a model of a real-world environment based on the tracked visual features. Non-limiting examples of the visual tracking system include: a visual Simultaneous Localization and Mapping system (VSLAM), and Visual Inertial Odometry (VIO) system. VSLAM can be used to build a target from an environment, or a scene based on one or more cameras of the visual tracking system. VIO (also referred to as a visual-inertial tracking) determines a latest pose (e.g., position and orientation) of a device based on data acquired from its multiple sensors (e.g., optical sensors, inertial sensors).

The term "Inertial Measurement Unit" (IMU) is used herein to refer to a device that can report on the inertial status of a moving body including the acceleration, velocity, orientation, and position of the moving body. An IMU enables tracking of movement of a body by integrating the acceleration and the angular velocity measured by the IMU. IMU can also refer to a combination of accelerometers and gyroscopes that can determine and quantify linear acceleration and angular velocity, respectively. The values obtained from the IMUs gyroscopes can be processed to obtain the pitch, roll, and heading of the IMU and, therefore, of the body with which the IMU is associated. Signals from the IMU's accelerometers also can be processed to obtain velocity and displacement of the IMU.

The term "motion-to-photon latency" (M2P latency) is used herein to refer to the duration between the user moving a visual tracking device and the presentation of its virtual content adapting to that specific motion. The motion-to-photon latency can also refer to latency associated with presenting virtual content in an AR device. As the user moves the AR device, the user's view of the real-world environment changes instantaneously. However, the virtual content takes a longer time to update because the AR device has to process the environmental data with IMU data, render the virtual content, and project the virtual content in front of the user's field of view. Motion-to-photon latency can cause the virtual content to appear jittery or lagging, and diminishes the user's AR experience.

The terms "time-warp" (also referred to as "time-warping", "late-warp", "late-warping") is used herein to refer to a re-projection technique that warps the rendered image before sending it to the display to correct for the head movement occurred after the rendering. This process takes the already rendered image, modifies it with the latest collected rotational data from the IMU, and then displays the warped image on the screen.

Previous solutions for reducing M2P latency rely on detecting feature points on stationary physical objects. In other words, previous solutions only address the latency due to motion of the AR display device and not the physical objects. M2P of physical objects that also move independently of the AR display device (e.g., such as the user's hands or physical objects moving in the real-world environment) result in additional M2P latency.

The present application describes a system and method for reducing motion-to-photon latency in an AR device. The present system not only considers the motion of the AR display device, but also tracks the motion of the physical objects to be augmented. The system applies a late-warping process that is optimized for both (movement of the AR device, and movement of the physical object). For example, the AR device tracks another person's face (using computer vision algorithm). The AR device applies the late-warping process based on the latest location of the tracked face and the latest IMU data. By tracking and considering both the AR device motion and the face motion, the AR device can generate augmentations that are more accurately placed on top of the face. In another example, the late-warping process considers the predetermined animation motion of a virtual object. In yet another example, the late-warping process considers both the latest location of a static physical object, and the latest location of a dynamic physical object.

In one example embodiment, a method for minimizing latency of moving objects in an augmented reality (AR) display device is described. In one aspect, the method includes determining an initial pose of a visual tracking device, identifying an initial location of an object in an image that is generated by an optical sensor of the visual tracking device, the image corresponding to the initial pose of the visual tracking device, rendering virtual content based on the initial pose and the initial location of the object, retrieving an updated pose of the visual tracking device, tracking an updated location of the object in an updated image that corresponds to the updated pose, and applying a time warp transformation to the rendered virtual content based on the updated pose and the updated location of the object to generate transformed virtual content.

As a result, one or more of the methodologies described herein facilitate solving the technical problem of latency in displaying rendered moving objects in a visual tracking device by considering the motion of the tracked physical objects in the late-warping process. The presently described method provides an improvement to an operation of the functioning of a computer by providing M2P latency reduction. As such, one or more of the methodologies described herein may obviate a need for certain efforts or computing resources. Examples of such computing resources include Processor cycles, network traffic, memory usage, data storage capacity, power consumption, network bandwidth, and cooling capacity.

FIG. 1 is a network diagram illustrating an environment 100 suitable for operating an AR/VR device 106, according to some example embodiments. The environment 100 includes a user 102, an AR/VR device 106, and a physical object 104. A user 102 operates the AR/VR device 106. The user 102 may be a human user (e.g., a human being), a machine user (e.g., a computer configured by a software program to interact with the AR/VR device 106), or any suitable combination thereof (e.g., a human assisted by a machine or a machine supervised by a human). The user 102 operates the AR/VR device 106.

The AR/VR device 106 may be a computing device with a display such as a smartphone, a tablet computer, or a wearable computing device (e.g., watch or glasses). The computing device may be hand-held or may be removable mounted to a head of the user 102. In one example, the display includes a screen that displays images captured with a camera of the AR/VR device 106. In another example, the display of the AR/VR device 106 may be transparent such as in lenses of wearable computing glasses. In other examples, the display may be non-transparent, partially transparent, partially opaque. In yet other examples, the display may be wearable by the user 102 to cover the field of view of the user 102.

The AR/VR device 106 includes an AR application generates virtual content based on images detected with the camera of the AR/VR device 106. For example, the user 102 may point the AR/VR device 106 to capture an image of the physical object 104. In one example, the user 102 moves or rotates the AR/VR device 106 in one direction while the physical object 104 moves in another direction. The AR application generates virtual content corresponding to an identified object (e.g., physical object 104) in the image and presents the virtual content in a display of the AR/VR device 106.

The AR/VR device 106 includes a tracking system 108. In one example, the tracking system 108 tracks the pose (e.g., position and orientation) of the AR/VR device 106 relative to the real-world environment 110 using, for example, optical sensors (e.g., depth-enabled 3D camera, image camera), inertial sensors (e.g., gyroscope, accelerometer, magnetometer), wireless sensors (Bluetooth, Wi-Fi), GPS sensor, and audio sensor. In another example, the tracking system 108 tracks a location the physical object 104 or a location of virtual content (generated by the AR/VR device 106). The AR/VR device 106 displays virtual content based on the pose of the AR/VR device 106 relative to the real-world environment 110 and/or the physical object 104.

The AR/VR device 106 may operate over a computer network. The computer network may be any network that enables communication between or among machines, databases, and devices. Accordingly, the computer network may be a wired network, a wireless network (e.g., a mobile or cellular network), or any suitable combination thereof. The computer network may include one or more portions that constitute a private network, a public network (e.g., the Internet), or any suitable combination thereof.

Any of the machines, databases, or devices shown in FIG. 1 may be implemented in a general-purpose computer modified (e.g., configured or programmed) by software to be a special-purpose computer to perform one or more of the functions described herein for that machine, database, or device. For example, a computer system able to implement any one or more of the methodologies described herein is discussed below with respect to FIG. 7 to FIG. 10. As used herein, a "database" is a data storage resource and may store data structured as a text file, a table, a spreadsheet, a relational database (e.g., an object-relational database), a triple store, a hierarchical data store, or any suitable combination thereof. Moreover, any two or more of the machines, databases, or devices illustrated in FIG. 1 may be combined into a single machine, and the functions described herein for any single machine, database, or device may be subdivided among multiple machines, databases, or devices.

Figure 2:
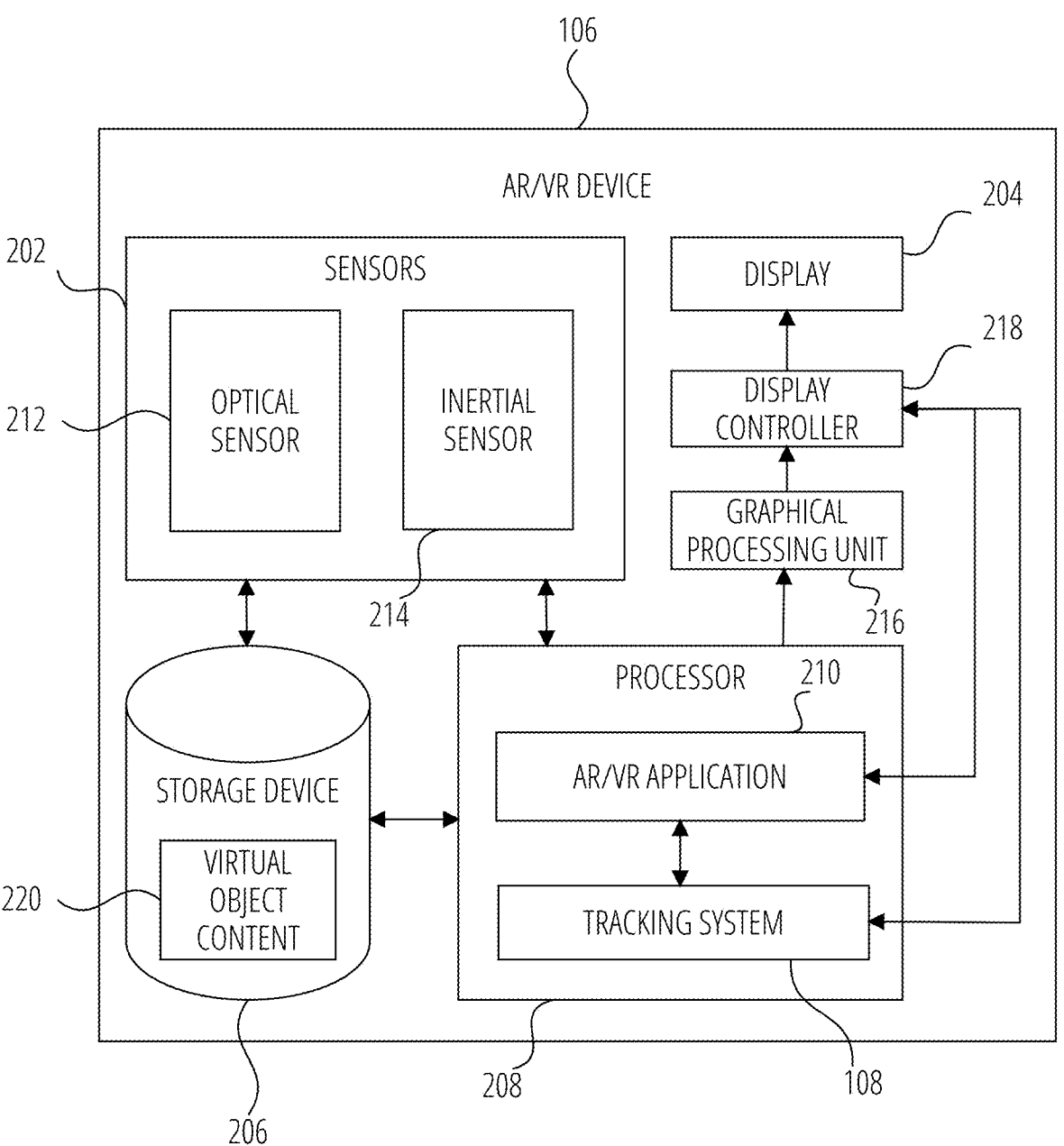
FIG. 2 is a block diagram illustrating an AR/VR display device in accordance with one example embodiment.

FIG. 2 is a block diagram illustrating modules (e.g., components) of the AR/VR device 106, according to some example embodiments. The AR/VR device 106 includes sensors 202, a display 204, a processor 208, a Graphical Processing Unit 216, a display controller 218, and a storage device 206. Examples of AR/VR device 106 include a wearable computing device (e.g., glasses), a tablet computer, a navigational device, a portable media device, or a smart phone.

The sensors 202 include, for example, an optical sensor 212 (e.g., camera such as a color camera, a thermal camera, a depth sensor and one or multiple grayscale, global shutter tracking cameras) and an inertial sensor 214 (e.g., gyroscope, accelerometer, magnetometer). Other examples of sensors 202 include a proximity or location sensor (e.g., near field communication, GPS, Bluetooth, Wifi), an audio sensor (e.g., a microphone), or any suitable combination thereof. It is noted that the sensors 202 described herein are for illustration purposes and the sensors 202 are thus not limited to the ones described above.

The display 204 includes a screen or monitor configured to display images generated by the processor 208. In one example embodiment, the display 204 may be transparent or semi-transparent so that the user 102 can see through the display 204 (in AR use case). In another example, the display 204 (e.g., a LCOS display) presents each frame of virtual content in multiple presentations.

The processor 208 includes an AR/VR application 210 and a tracking system 108. The AR/VR application 210 detects and identifies a physical environment or the physical object 104 using computer vision. The AR/VR application 210 retrieves a virtual object (e.g., 3D object model) based on the identified physical object 104 or physical environment. The AR/VR application 210 renders the virtual object in the display 204. For an AR application, the AR/VR application 210 includes a local rendering engine that renders a 3D model of a virtual object overlaid (e.g., superimposed upon, or otherwise displayed in tandem with) on an image or a view of the physical object 104. A view of the virtual object may be manipulated by adjusting a position of the physical object 104 (e.g., its physical location, orientation, or both) relative to the optical sensor 212. Similarly, a view of the virtual object may be manipulated by adjusting a pose of the AR/VR device 106 relative to the physical object 104. For a VR application, the AR/VR application 210 displays the virtual object in the display 204 at a location (in the display 204) determined based on a pose of the AR/VR device 106.

In one example embodiment, the tracking system 108 estimates a pose of the AR/VR device 106. For example, the tracking system 108 uses image data and corresponding inertial data from the optical sensor 212 and the inertial sensor 214 to track a location and pose of the AR/VR device 106 relative to a frame of reference (e.g., real-world environment 110). In one example, the tracking system 108 uses the sensor data to determine the three-dimensional pose of the AR/VR device 106. The three-dimensional pose is a determined orientation and position of the AR/VR device 106 in relation to the user's real-world environment 110. For example, the AR/VR device 106 may use images of the user's real-world environment 110, as well as other sensor data to identify a relative position and orientation of the AR/VR device 106 from physical objects in the real-world environment 110 surrounding the AR/VR device 106. The tracking system 108 continually gathers and uses updated sensor data describing movements of the AR/VR device 106 to determine updated three-dimensional poses of the AR/VR device 106 that indicate changes in the relative position and orientation of the AR/VR device 106 from the physical objects in the real-world environment 110. The tracking system 108 provides the three-dimensional pose of the AR/VR device 106 to the Graphical Processing Unit 216.

In another example embodiment, the tracking system 108 tracks (using computer vision) a location of a detected physical object. For example, the tracking system 108 includes a facial recognition algorithm and facial tracking algorithm that detects and tracks a face in the images captured by the optical sensor 212. In another example, the tracking system 108 tracks a location of dynamic virtual content based on their predefined/preset behavior. For example, the tracking system 108 accesses animation configuration of a virtual object to identify the trajectory, behavior, path of the virtual object over time.

The Graphical Processing Unit 216 includes a render engine (not shown) that is configured to render a frame of a 3D model of a virtual object based on the virtual content provided by the AR/VR application 210 and the pose provided by the tracking system 108. In other words, the Graphical Processing Unit 216 uses the three-dimensional pose of the AR/VR device 106 to generate frames of virtual content to be presented on the display 204. For example, the Graphical Processing Unit 216 uses the three-dimensional pose to render a frame of the virtual content such that the virtual content is presented at an appropriate orientation and position in the display 204 to properly augment the user's reality. As an example, the Graphical Processing Unit 216 may use the three-dimensional pose data to render a frame of virtual content such that, when presented on the display 204, the virtual content overlaps with a physical object in the user's real-world environment 110. The Graphical Processing Unit 216 generates updated frames of virtual content based on updated three-dimensional poses of the AR/VR device 106, which reflect changes in the position and orientation of the user in relation to physical objects in the user's real-world environment 110. The Graphical Processing Unit 216 transfers the rendered frame to the display controller 218.

The display controller 218 is positioned as an intermediary between the Graphical Processing Unit 216 and the display 204. The display controller 218 receives the image data (e.g., rendered frame) from the Graphical Processing Unit 216, re-adjusts a location of the rendered virtual content in a time-warped frame by performing a late-warping transformation based on a latest pose of the AR/VR device 106 and the latest tracking information (of a tracked physical object, of a preset animation of a virtual object, of multiple physical objects having different movement). The display controller 218 provides the time-warped frame to the display 204 for display.

The storage device 206 stores virtual object content 220. The virtual object content 220 includes, for example, a database of visual references (e.g., images, QR codes) and corresponding virtual content (e.g., three-dimensional model of virtual objects).

Any one or more of the modules described herein may be implemented using hardware (e.g., a processor of a machine) or a combination of hardware and software. For example, any module described herein may configure a processor to perform the operations described herein for that module. Moreover, any two or more of these modules may be combined into a single module, and the functions described herein for a single module may be subdivided among multiple modules. Furthermore, according to various example embodiments, modules described herein as being implemented within a single machine, database, or device may be distributed across multiple machines, databases, or devices.

Figure 3:
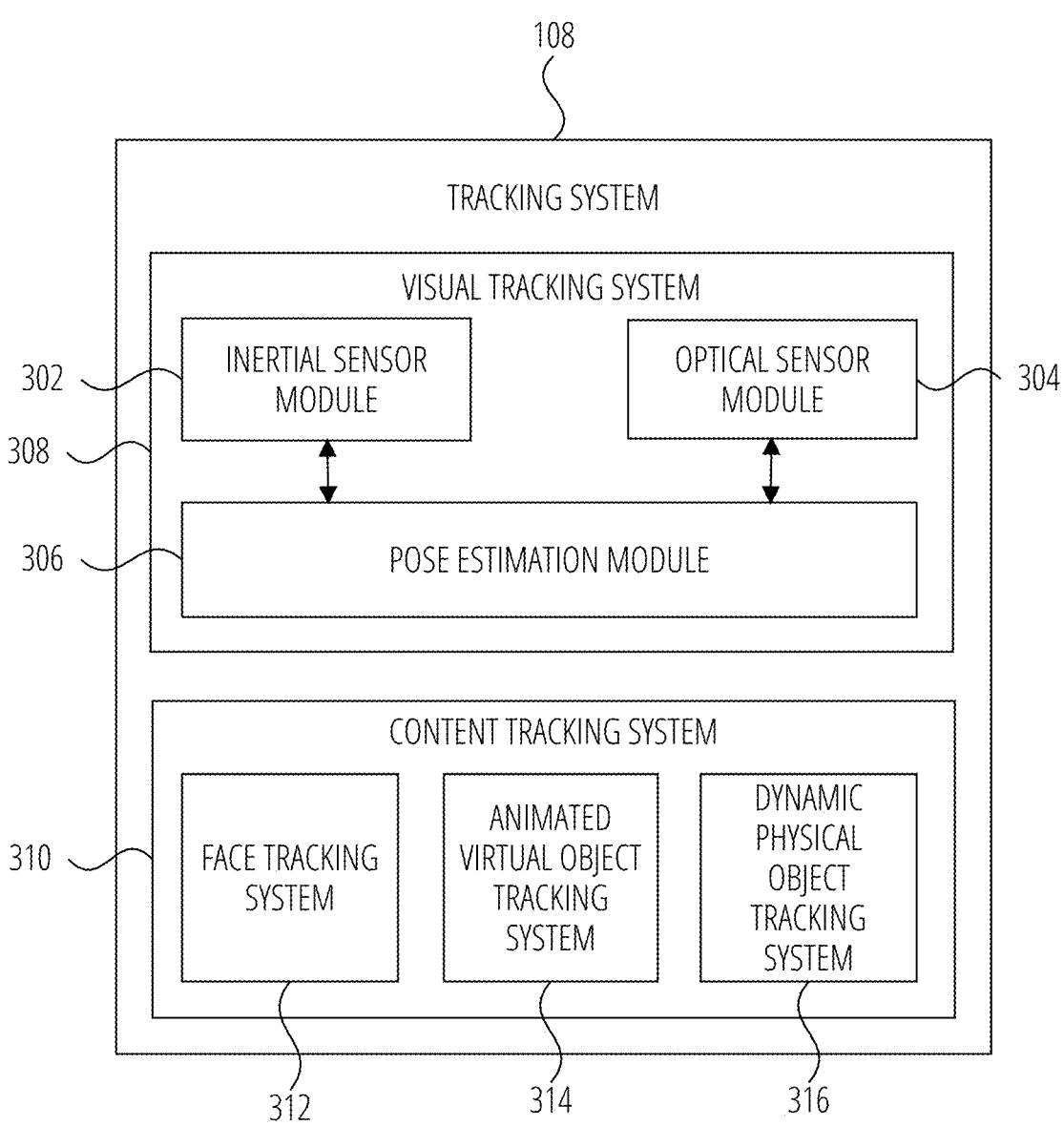
FIG. 3 is a block diagram illustrating a tracking system in accordance with one example embodiment.

FIG. 3 illustrates the tracking system 108 in accordance with one example embodiment. The tracking system 108 includes, for example, a visual tracking system 308 and a content tracking system 310.

The visual tracking system 308 includes an inertial sensor module 302, an optical sensor module 304, and a pose estimation module 306. The inertial sensor module 302 accesses inertial sensor data from the inertial sensor 214. The optical sensor module 304 accesses optical sensor data from the optical sensor 212.

The pose estimation module 306 determines a pose (e.g., location, position, orientation) of the AR/VR device 106 relative to a frame of reference (e.g., real-world environment 110). In one example embodiment, the pose estimation module 306 estimates the pose of the AR/VR device 106 based on 3D maps of feature points from images captured by the optical sensor 212 and from the inertial sensor data captured by the inertial sensor 214.

In one example, the pose estimation module 306 includes an algorithm that combines inertial information from the inertial sensor 214 and image information from the optical sensor 212 that are coupled to a rigid platform (e.g., AR/VR device 106) or a rig. A rig may consist of multiple cameras (with non-overlapping (distributed aperture) or overlapping (stereo or more) fields-of-view) mounted on a rigid platform with an IMU (e.g., rig may thus have at least one IMU and at least one camera). In another example embodiment, the presently described motion-to-photon latency optimization may operate with simpler tracking modules (e.g., one where only rotation data from IMU is tracked) and thus does not require image data from the optical sensor 212.

The content tracking system 310 includes a face tracking system 312, an animated virtual object tracking system 314, and a dynamic physical object tracking system 316. The face tracking system 312 uses computer vision to detect and track a location of a face (within an image). In one example, the face tracking system 312 detects and tracks a face of another person in the image captured with the optical sensor 212.

The animated virtual object tracking system 314 retrieves the configurations of an animated virtual object to identify and track its latest location. The configuration of the animated virtual object indicates a predefined behavior of the animated virtual object. For example, the animated virtual object includes a virtual ball having a predefined trajectory.

The dynamic physical object tracking system 316 uses computer vision to identify a moving physical object and track its latest location (within an image). For example, the dynamic physical object tracking system 316 tracks a location of a moving physical object (e.g., a hand, a human body, a car, or any other physical object).

Figure 4:
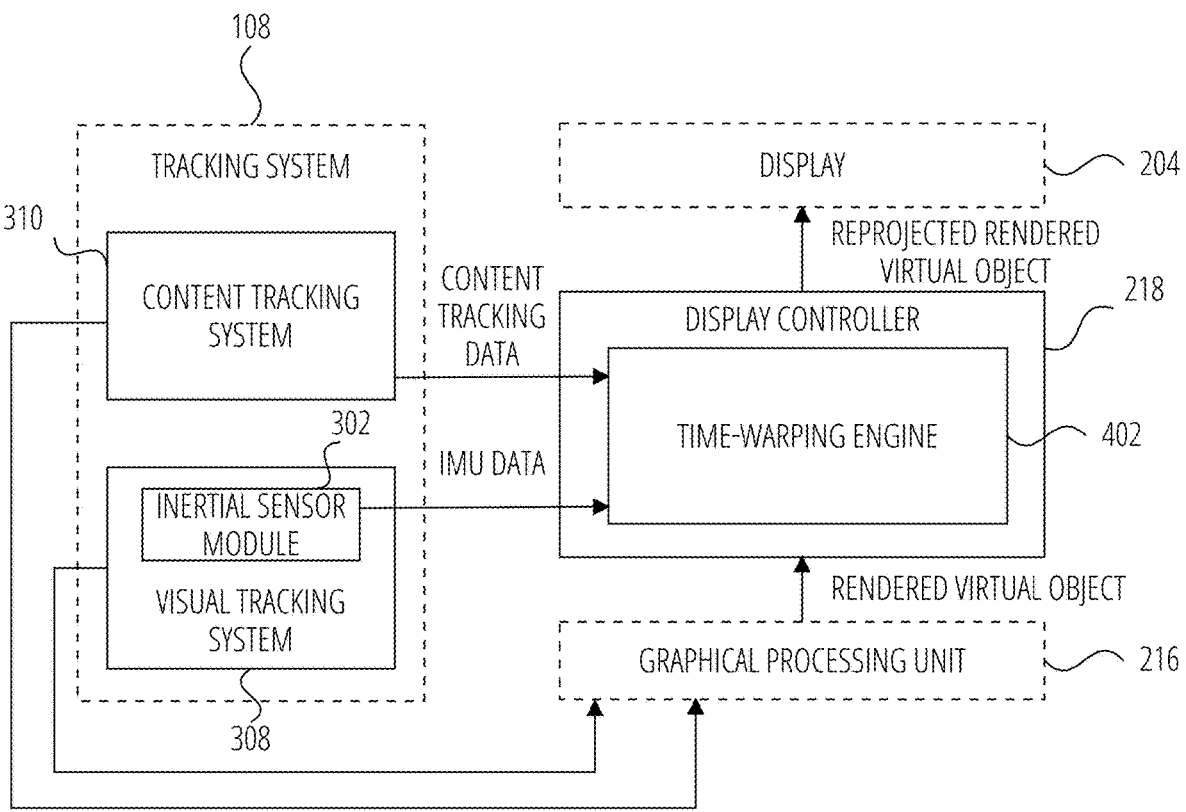
FIG. 4 is a block diagram illustrating a display controller in accordance with one example embodiment.

FIG. 4 is a block diagram illustrating a display controller 218 in accordance with one example embodiment. The display controller 218 includes a time-warping engine 402 that receives a rendered virtual object from the Graphical Processing Unit 216.

The time-warping engine 402 retrieves a latest orientation data of the AR/VR device 106 from the inertial sensor module 302. The time-warping engine 402 retrieves a latest location of a moving physical object, of an animated virtual object, or of a combination of a static physical object and dynamic physical object.

The time-warping engine 402 warps/re-projects the rendered virtual object to generate a re-projected/warped frame based on the combination of the latest IMU data from the visual tracking system 308 and the latest location of tracked content from the content tracking system 310. The time-warping engine 402 provides the warped frame to the display 204 for display.

Figure 5:
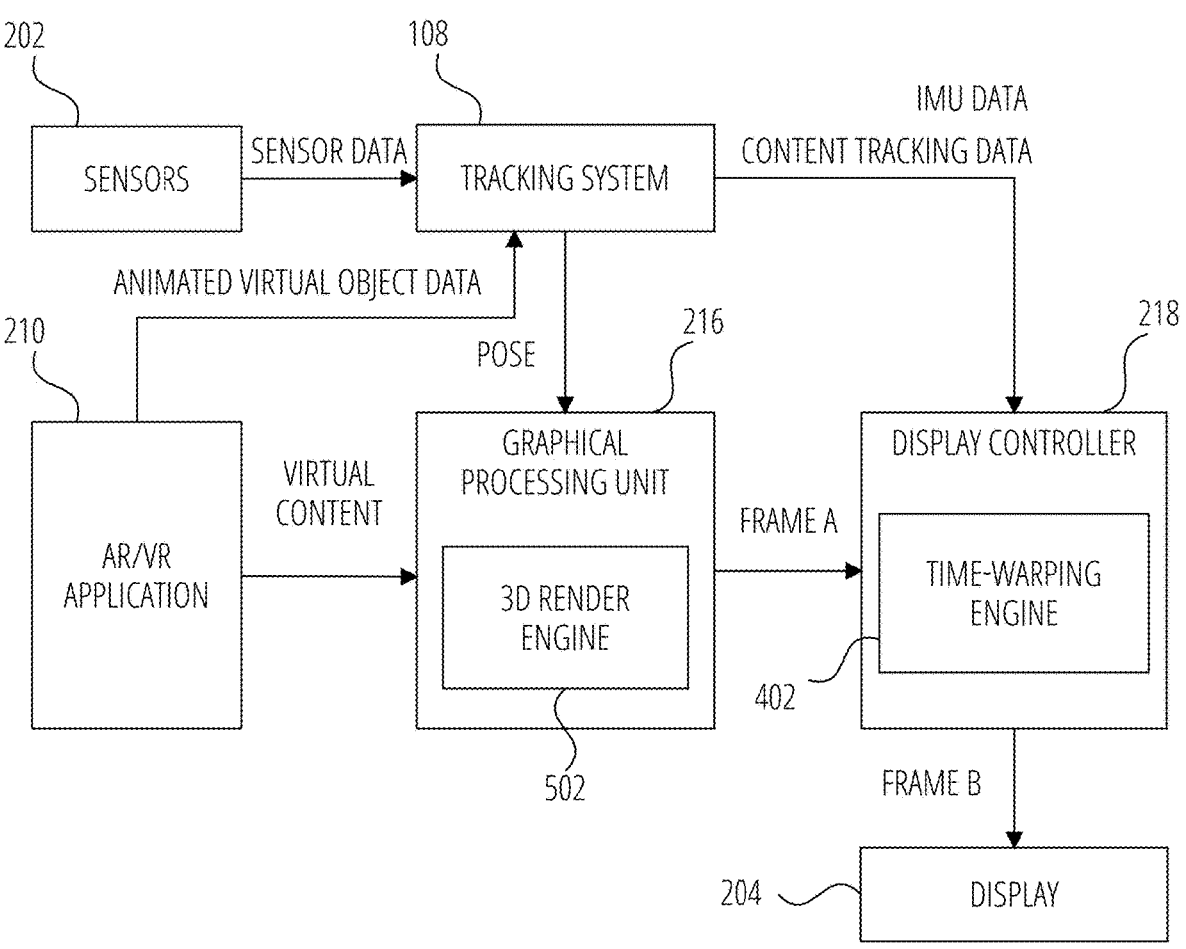
FIG. 5 is a block diagram illustrating a process for time-warping in accordance with one example embodiment.

FIG. 5 is a block diagram illustrating an example process in accordance with one example embodiment. The tracking system 108 receives sensor data from sensors 202 to determine a pose (e.g., pose a) of the AR/VR device 106. The tracking system 108 provides the pose to the Graphical Processing Unit 216. The Graphical Processing Unit 216 operates a 3D render engine 502 to render a frame (e.g., frame a) of an animated/non-animated virtual content (provided by the AR/VR application 210) and at a location (in the display 204) based on the pose (e.g., pose a) received from tracking system 108. The Graphical Processing Unit 216 provides the rendered frame (e.g., frame a) to the display controller 218.

The display controller 218 receives the latest pose or rotational data (e.g., IMU data) from the tracking system 108. The display controller 218 further receives content tracking data (that indicate a latest location of tracked content (e.g., a face, a moving physical object)) from the tracking system 108.

The display controller 218 applies the time-warping engine 402 to the rendered virtual object by performing a three-dimensional shift operation to the rendered frame (e.g., frame a) based on the latest IMU data and latest content tracking data to generate a new frame (e.g., frame b). The display controller 218 communicates frame b to the display 204 for display.

Figure 6:
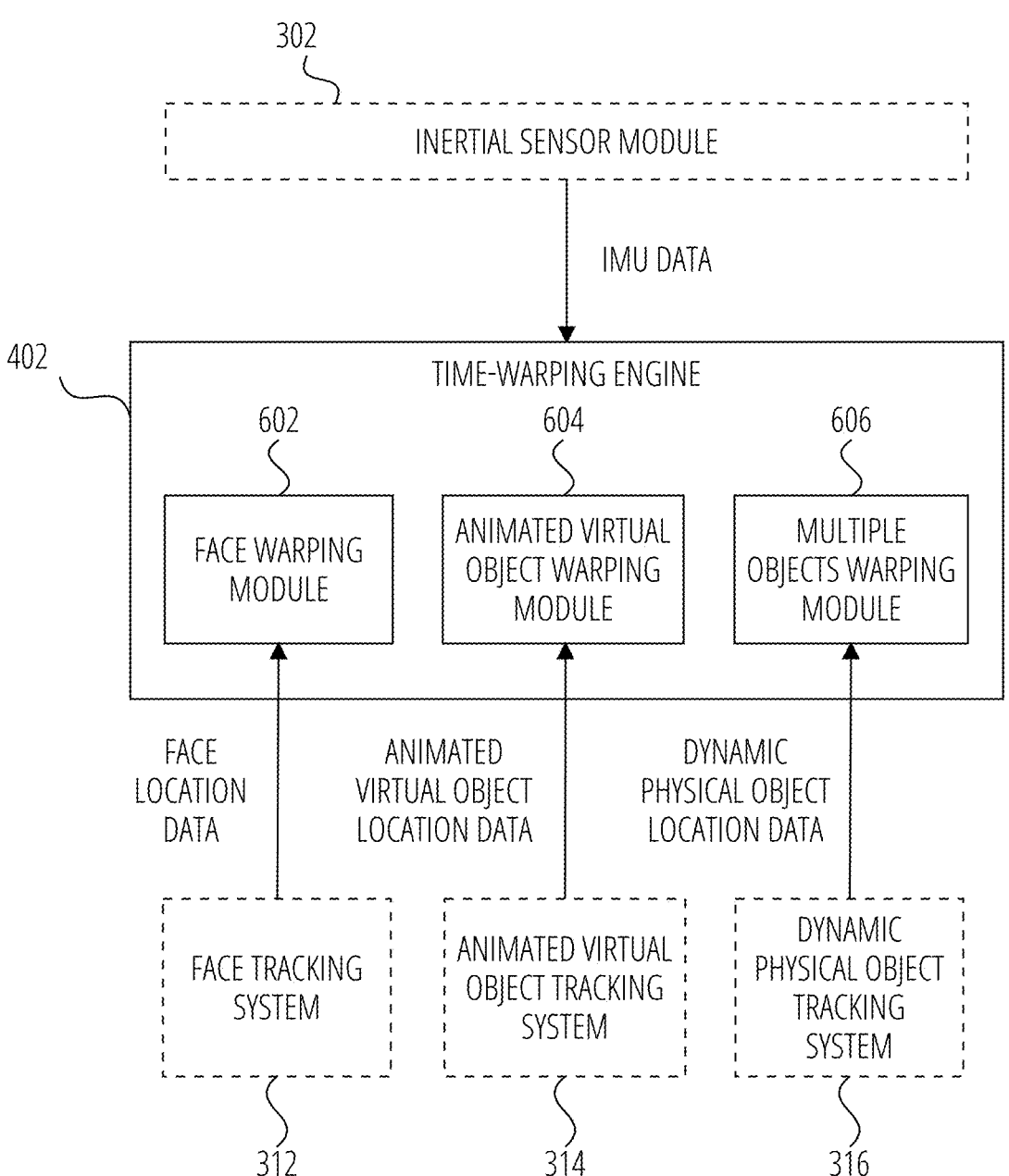
FIG. 6 is a block diagram illustrating a time-warping engine in accordance with one example embodiment.

FIG. 6 is a block diagram illustrating a time-warping engine 402 in accordance with one embodiment. The time-warping engine 402 includes a face warping module 602, an animated virtual object warping module 604, and a multiple objects warping module 606.

The face warping module 602 receives tracking data from the face tracking system 312. The tracking data include a latest location/position of a face depicted in an image captured by the optical sensor 212. For example, the user may be moving. The optical sensor 212 captures a first picture that depicts the user at a first location in the first picture. The 3D render engine 502 generates a rendered virtual object based on the pose of the AR/VR device 106 and the face of the user at the first location. Subsequently, the optical sensor 212 captures a second picture depicting that the user has moved to a second location in the second picture. The face warping module 602 applies a late-warping algorithm to the rendered image based on the latest IMU data from the inertial sensor module 302 and the tracked face of the user at the second location (the latest user face location as determined by the face tracking algorithm).

The animated virtual object warping module 604 receives tracking data from the animated virtual object tracking system 314. The tracking data include a latest position of the animated virtual object (generated by the AR/VR application 210) within an image captured by the optical sensor 212. The latest position may be identified based on an animation configuration setting of the animated virtual object. For example, the animation configuration setting defines a set trajectory for the animated virtual object. The animated virtual object warping module 604 applies a late-warping algorithm to a rendered image based on the latest location (or predicted location) of the animated virtual object (per settings in the animation configuration) and based on the latest IMU data from the inertial sensor module 302.

The multiple objects warping module 606 receives tracking data of one or more physical object being tracked by a computer vision algorithm of the dynamic physical object tracking system 316. The tracking data include a latest location/position of a first and second physical object depicted in an image captured by the optical sensor 212. For example, the first physical object is stationary, while the second physical object is moving.

The multiple objects warping module 606 individually applies a late-warping algorithm to each tracked physical object in separate render layers. For example, the multiple objects warping module 606 applies a late-warping algorithm to the first physical object based on the latest IMU data from the inertial sensor module 302 and the tracked location of the first physical object to generate a first warped layer. The multiple objects warping module 606 applies a late-warping algorithm to the second physical object based on the latest IMU data from the inertial sensor module 302 and the tracked location of the second physical object to generate a second warped layer. The multiple objects warping module 606 then combines the first warped layer and the second warped layer into a single rendered frame.

FIG. 7 is a flow diagram illustrating a method 700 for applying a time-warping process in accordance with one example embodiment. Operations in the method 700 may be performed by the AR/VR device 106, using components (e.g., modules, engines) described above with respect to FIG. 4. Accordingly, the method 700 is described by way of example with reference to the AR/VR device 106. However, it shall be appreciated that at least some of the operations of the method 700 may be deployed on various other hardware configurations or be performed by similar components residing elsewhere.

In block 702, the visual tracking system 308 identifies an initial pose of the AR/VR device 106. In block 704, the content tracking system 310 tracks a location of an object in an image corresponding to the initial pose. In block 706, the Graphical Processing Unit 216 renders virtual content based on the initial pose and the location of the object. In block 708, the time-warping engine display controller 218 retrieves an updated pose of the AR/VR device 106 (based on the latest IMU data from the inertial sensor module 302). In block 710, the content tracking system 310 retrieves an updated location of the object in an updated image corresponding to the updated pose. In block 712, the time-warping engine 402 applies a time-warp transformation to the virtual content based on the updated pose and the updated location of the object. In block 714, the display 204 displays the transformed image.

It is to be noted that other embodiments may use different sequencing, additional or fewer operations, and different nomenclature or terminology to accomplish similar functions. In some embodiments, various operations may be performed in parallel with other operations, either in a synchronous or asynchronous manner. The operations described herein were chosen to illustrate some principles of operations in a simplified form.

FIG. 8 is a flow diagram illustrating a method 800 for applying a time-warping process in accordance with one example embodiment. Operations in the method 800 may be performed by the AR/VR device 106, using components (e.g., modules, engines) described above with respect to FIG. 4. Accordingly, the method 800 is described by way of example with reference to the AR/VR device 106. However, it shall be appreciated that at least some of the operations of the method 800 may be deployed on various other hardware configurations or be performed by similar components residing elsewhere.

In block 802, the pose estimation module 306 determines an initial pose of the AR/VR device 106. In block 804, the face tracking system 312 tracks a location of a person's face in an image corresponding to the initial pose of the AR/VR device 106. In block 806, the AR/VR application 210 retrieves virtual content based on the face in the image. In block 808, the Graphical Processing Unit 216 renders a 3D model of the virtual content using a render engine based on the initial pose. In block 810, the face warping module 602 accesses updated inertial sensor data from the inertial sensor module 302 after the render. In block 812, the face warping module 602 accesses updated location of the face in an updated image after the render from the face tracking system 312. In block 814, the face warping module 602 applies a transformation of the rendered 3D model based on the updated inertial sensor data and the updated location of the face.

FIG. 9 is a flow diagram illustrating a method 900 for applying a time-warping process in accordance with one example embodiment. Operations in the method 900 may be performed by the AR/VR device 106, using components (e.g., modules, engines) described above with respect to FIG. 3. Accordingly, the method 900 is described by way of example with reference to the AR/VR device 106. However, it shall be appreciated that at least some of the operations of the method 900 may be deployed on various other hardware configurations or be performed by similar Components residing elsewhere.

In block 902, the visual tracking system 308 identifies an initial pose of the AR/VR device 106. In block 904, the dynamic physical object tracking system 316 tracks a location of first and second virtual object in an image corresponding to the initial pose. In block 906, the Graphical Processing Unit 216 renders a first layer of virtual content based on the initial pose and the location of the first virtual object. In block 908, the Graphical Processing Unit 216 renders a second layer of virtual content based on the initial pose and the location of the second virtual object. In block 910, the time-warping engine 402 retrieves an updated pose of the AR/VR device 106 (based on the latest IMU data from Inertial sensor module 302). In block 912, the dynamic physical object tracking system 316 identifies an updated location of the first virtual object in an updated image corresponding to the updated pose. In block 914, the dynamic physical object tracking system 316 identifies an updated location of the second virtual object in the updated image corresponding to the updated pose. The method 900 continues at block 916 in FIG. 10.

FIG. 10 is a flow diagram illustrating a method 1000 for applying a time-warping process in accordance with one example embodiment. Operations in the method 1000 may be performed by the AR/VR device 106, using components (e.g., modules, engines) described above with respect to FIG. 2. Accordingly, the method 1000 is described by way of example with reference to the AR/VR device 106. However, it shall be appreciated that at least some of the operations of the method 1000 may be deployed on various other hardware configurations or be performed by similar components residing elsewhere.

The method 1000 continues from block 916 of FIG. 9. In block 1002, the multiple objects warping module 606 applies a time-warp transformation to the first layer based on the updated pose and the updated location of the first virtual object. In block 1004, the multiple objects warping module 606 applies a time-warp transformation to the second layer based on the updated pose and the updated location of the second virtual object. In block 1006, the multiple objects warping module 606 combines the first layer and the second layer in a single rendered frame. In block 1008, the display 204 displays the single rendered frame.

System with Head-Wearable Apparatus

Figure 11:
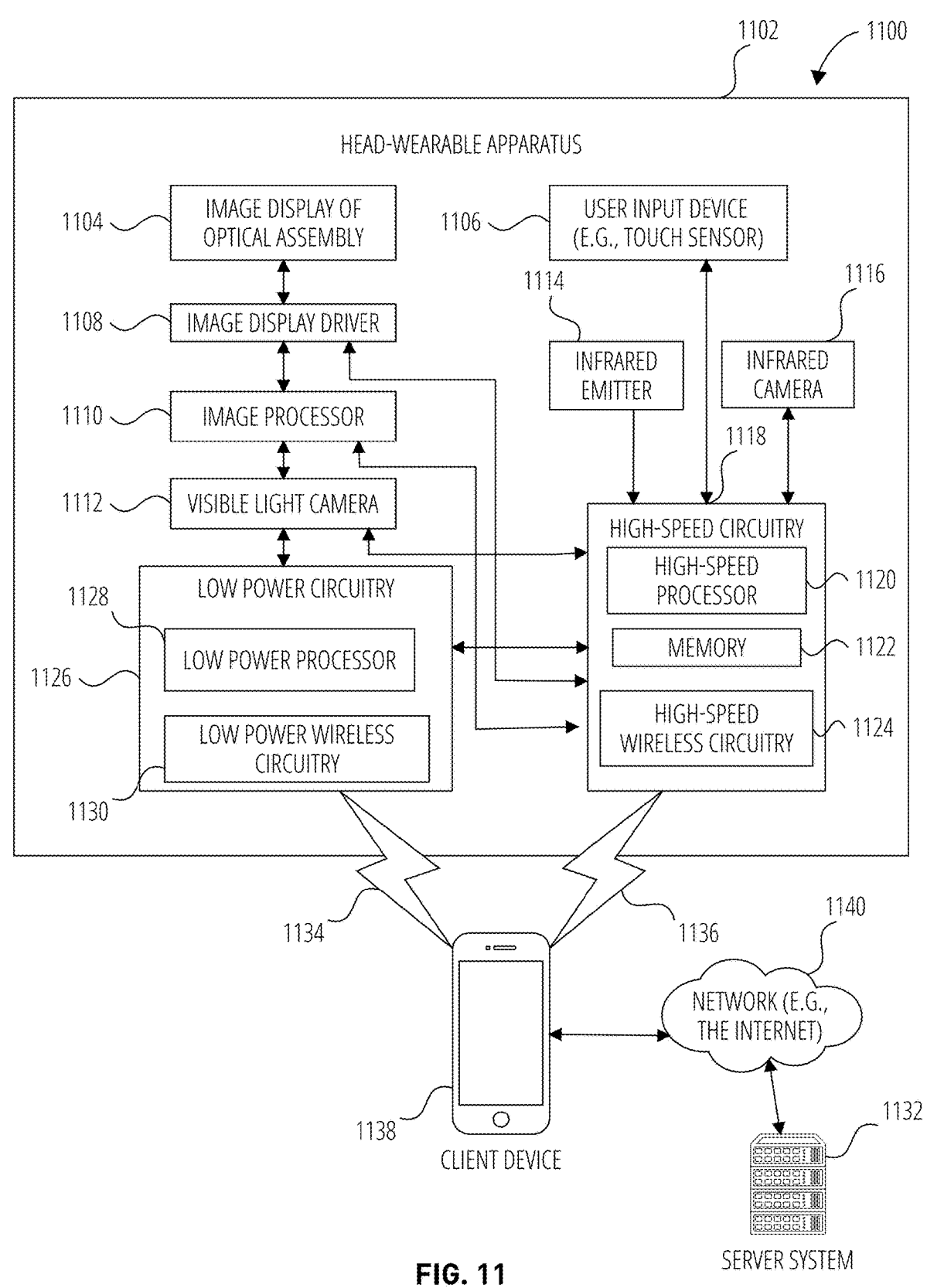
FIG. 11 illustrates a network environment in which a head-wearable device can be implemented according to one example embodiment.

FIG. 11 illustrates a network environment 1100 in which the head-wearable apparatus 1102 can be implemented according to one example embodiment. FIG. 11 is a high-level functional block diagram of an example head-wearable apparatus 1102 communicatively coupled a mobile client device 1138 and a server system 1132 via various network 1140.

head-wearable apparatus 1102 includes a camera, such as at least one of visible light camera 1112, infrared emitter 1114 and infrared camera 1116. The client device 1138 can be capable of connecting with head-wearable apparatus 1102 using both a communication 1134 and a communication 1136. client device 1138 is connected to server system 1132 and network 1140. The network 1140 may include any combination of wired and wireless connections.

The head-wearable apparatus 1102 further includes two image displays of the image display of optical assembly 1104. The two include one associated with the left lateral side and one associated with the right lateral side of the head-wearable apparatus 1102. The head-wearable apparatus 1102 also includes image display driver 1108, image processor 1110, low-power low power circuitry 1126, and high-speed circuitry 1118. The image display of optical assembly 1104 are for presenting images and videos, including an image that can include a graphical user interface to a user of the head-wearable apparatus 1102.

The image display driver 1108 commands and controls the image display of the image display of optical assembly 1104. The image display driver 1108 may deliver image data directly to the image display of the image display of optical assembly 1104 for presentation or may have to convert the image data into a signal or data format suitable for delivery to the image display device. For example, the image data may be video data formatted according to compression formats, such as H. 264 (MPEG-4 Part 10), HEVC, Theora, Dirac, RealVideo RV40, VP8, VP9, or the like, and still image data may be formatted according to compression formats such as Portable Network Group (PNG), Joint Photographic Experts Group (JPEG), Tagged Image File Format (TIFF) or exchangeable image file format (Exif) or the like.

As noted above, head-wearable apparatus 1102 includes a frame and stems (or temples) extending from a lateral side of the frame. The head-wearable apparatus 1102 further includes a user input device 1106 (e.g., touch sensor or push button) including an input surface on the head-wearable apparatus 1102. The user input device 1106 (e.g., touch sensor or push button) is to receive from the user an input selection to manipulate the graphical user interface of the presented image.

The components shown in FIG. 11 for the head-wearable apparatus 1102 are located on one or more circuit boards, for example a PCB or flexible PCB, in the rims or temples. Alternatively, or additionally, the depicted components can be located in the chunks, frames, hinges, or bridge of the head-wearable apparatus 1102. Left and right can include digital camera elements such as a complementary metal-oxide-semiconductor (CMOS) image sensor, charge coupled device, a camera lens, or any other respective visible or light capturing elements that may be used to capture data, including images of scenes with unknown objects.

The head-wearable apparatus 1102 includes a memory 1122 which stores instructions to perform a subset or all of the functions described herein. memory 1122 can also include storage device.

As shown in FIG. 11, high-speed circuitry 1118 includes high-speed processor 1120, memory 1122, and high-speed wireless circuitry 1124. In the example, the image display driver 1108 is coupled to the high-speed circuitry 1118 and operated by the high-speed processor 1120 in order to drive the left and right image displays of the image display of optical assembly 1104. high-speed processor 1120 may be any processor capable of managing high-speed communications and operation of any general computing system needed for head-wearable apparatus 1102. The high-speed processor 1120 includes processing resources needed for managing high-speed data transfers on communication 1136 to a wireless local area network (WLAN) using high-speed wireless circuitry 1124. In certain examples, the high-speed processor 1120 executes an operating system such as a LINUX operating system or other such operating system of the head-wearable apparatus 1102 and the operating system is stored in memory 1122 for execution. In addition to any other responsibilities, the high-speed processor 1120 executing a software architecture for the head-wearable apparatus 1102 is used to manage data transfers with high-speed wireless circuitry 1124. In certain examples, high-speed wireless circuitry 1124 is configured to implement Institute of Electrical and Electronic Engineers (IEEE) 802.11 communication standards, also referred to herein as Wi-Fi. In other examples, other high-speed communications standards may be implemented by high-speed wireless circuitry 1124.

The low power wireless circuitry 1130 and the high-speed wireless circuitry 1124 of the head-wearable apparatus 1102 can include short range transceivers (Bluetooth™) and wireless wide, local, or wide area network transceivers (e.g., cellular or WiFi). The client device 1138, including the transceivers communicating via the communication 1134 and communication 1136, may be implemented using details of the architecture of the head-wearable apparatus 1102, as can other elements of network 1140.

The memory 1122 includes any storage device capable of storing various data and applications, including, among other things, camera data generated by the left and right, infrared camera 1116, and the image processor 1110, as well as images generated for display by the image display driver 1108 on the image displays of the image display of optical assembly 1104. While memory 1122 is shown as integrated with high-speed circuitry 1118, in other examples, memory 1122 may be an independent standalone element of the head-wearable apparatus 1102. In certain such examples, electrical routing lines may provide a connection through a chip that includes the high-speed processor 1120 from the image processor 1110 or low power processor 1128 to the memory 1122. In other examples, the high-speed processor 1120 may manage addressing of memory 1122 such that the low power processor 1128 will boot the high-speed processor 1120 any time that a read or write operation involving memory 1122 is needed.

As shown in FIG. 11, the low power processor 1128 or high-speed processor 1120 of the head-wearable apparatus 1102 can be coupled to the camera (visible light camera 1112; infrared emitter 1114, or infrared camera 1116), the image display driver 1108, the user input device 1106 (e.g., touch sensor or push button), and the memory 1122.

The head-wearable apparatus 1102 is connected with a host computer. For example, the head-wearable apparatus 1102 is paired with the client device 1138 via the communication 1136 or connected to the server system 1132 via the network 1140. server system 1132 may be one or more computing devices as part of a service or network computing system, for example, that include a processor, a memory, and network communication interface to communicate over the network 1140 with the client device 1138 and head-wearable apparatus 1102.

The client device 1138 includes a processor and a network communication interface coupled to the processor. The network communication interface allows for communication over the network 1140, communication 1134 or communication 1136. client device 1138 can further store at least portions of the instructions for generating a binaural audio content in the client device 1138's memory to implement the functionality described herein.

Output components of the head-wearable apparatus 1102 include visual components, such as a display such as a liquid crystal display (LCD), a plasma display panel (PDP), a light emitting diode (LED) display, a projector, or a waveguide. The image displays of the optical assembly are driven by the image display driver 1108. The output components of the head-wearable apparatus 1102 further include acoustic components (e.g., speakers), haptic components (e.g., a vibratory motor), other signal generators, and so forth. The input components of the head-wearable apparatus 1102, the client device 1138, and server system 1132, such as the user input device 1106, may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location and force of touches or touch gestures, or other tactile input components), audio input components (e.g., a microphone), and the like.

The head-wearable apparatus 1102 may optionally include additional peripheral device elements. Such peripheral device elements may include biometric sensors, additional sensors, or display elements integrated with head-wearable apparatus 1102. For example, peripheral device elements may include any I/O components including output components, motion components, position components, or any other such elements described herein.

For example, the biometric components include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components include acceleration sensor components (e.g., accelerometer), gravitation sensor components, rotation sensor components (e.g., gyroscope), and so forth. The position components include location sensor components to generate location coordinates (e.g., a Global Positioning System (GPS) receiver component), WiFi or Bluetooth™ transceivers to generate positioning system coordinates, altitude sensor components (e.g., altimeters or barometers that detect air pressure from which altitude may be derived), orientation sensor components (e.g., magnetometers), and the like. Such positioning system coordinates can also be received over and communication 1136 from the client device 1138 via the low power wireless circuitry 1130 or high-speed wireless circuitry 1124.

Figure 12:
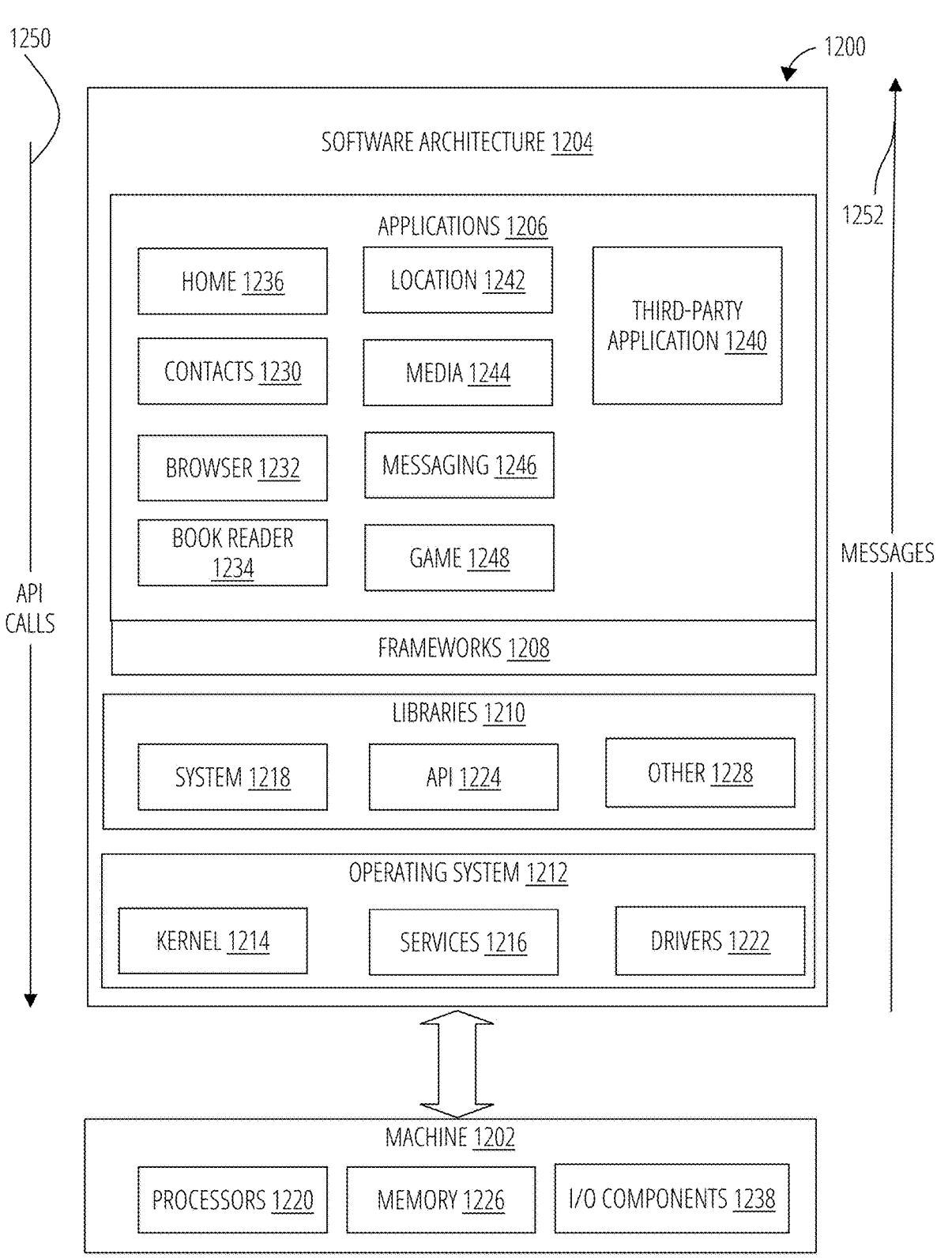
FIG. 12 is block diagram showing a software architecture within which the present disclosure may be implemented, according to an example embodiment.

FIG. 12 is a block diagram 1200 illustrating a software architecture 1204, which can be installed on any one or more of the devices described herein. The software architecture 1204 is supported by hardware such as a machine 1202 that includes Processors 1220, memory 1226, and I/O Components 1238. In this example, the software architecture 1204 can be conceptualized as a stack of layers, where each layer provides a particular functionality. The software architecture 1204 includes layers such as an operating system 1212, libraries 1210, frameworks 1208, and applications 1206. Operationally, the applications 1206 invoke API calls 1250 through the software stack and receive messages 1252 in response to the API calls 1250.

The operating system 1212 manages hardware resources and provides common services. The operating system 1212 includes, for example, a kernel 1214, services 1216, and drivers 1222. The kernel 1214 acts as an abstraction layer between the hardware and the other software layers. For example, the kernel 1214 provides memory management, Processor management (e.g., scheduling), Component management, networking, and security settings, among other functionality. The services 1216 can provide other common services for the other software layers. The drivers 1222 are responsible for controlling or interfacing with the underlying hardware. For instance, the drivers 1222 can include display drivers, camera drivers, BLUETOOTH® or BLUETOOTH® Low Energy drivers, flash memory drivers, serial communication drivers (e.g., Universal Serial Bus (USB) drivers), WI-FI® drivers, audio drivers, power management drivers, and so forth.

The libraries 1210 provide a low-level common infrastructure used by the applications 1206. The libraries 1210 can include system libraries 1218 (e.g., C standard library) that provide functions such as memory allocation functions, string manipulation functions, mathematic functions, and the like. In addition, the libraries 1210 can include API libraries 1224 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 1210 can also include a wide variety of other libraries 1228 to provide many other APIs to the applications 1206.

The frameworks 1208 provide a high-level common infrastructure that is used by the applications 1206. For example, the frameworks 1208 provide various graphical user interface (GUI) functions, high-level resource management, and high-level location services. The frameworks 1208 can provide a broad spectrum of other APIs that can be used by the applications 1206, some of which may be specific to a particular operating system or platform.

In an example embodiment, the applications 1206 may include a home application 1236, a contacts application 1230, a browser application 1232, a book reader application 1234, a location application 1242, a media application 1244, a messaging application 1246, a game application 1248, and a broad assortment of other applications such as a third-party application 1240. The applications 1206 are programs that execute functions defined in the programs. Various programming languages can be employed to create one or more of the applications 1206, structured in a variety of manners, such as object-oriented programming languages (e.g., Objective-C, Java, or C++) or procedural programming languages (e.g., C or assembly language). In a specific example, the third-party application 1240 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or Linux OS, or other mobile operating systems. In this example, the third-party application

1240 can invoke the API calls 1250 provided by the operating system 1212 to facilitate functionality described herein.

Figure 13:
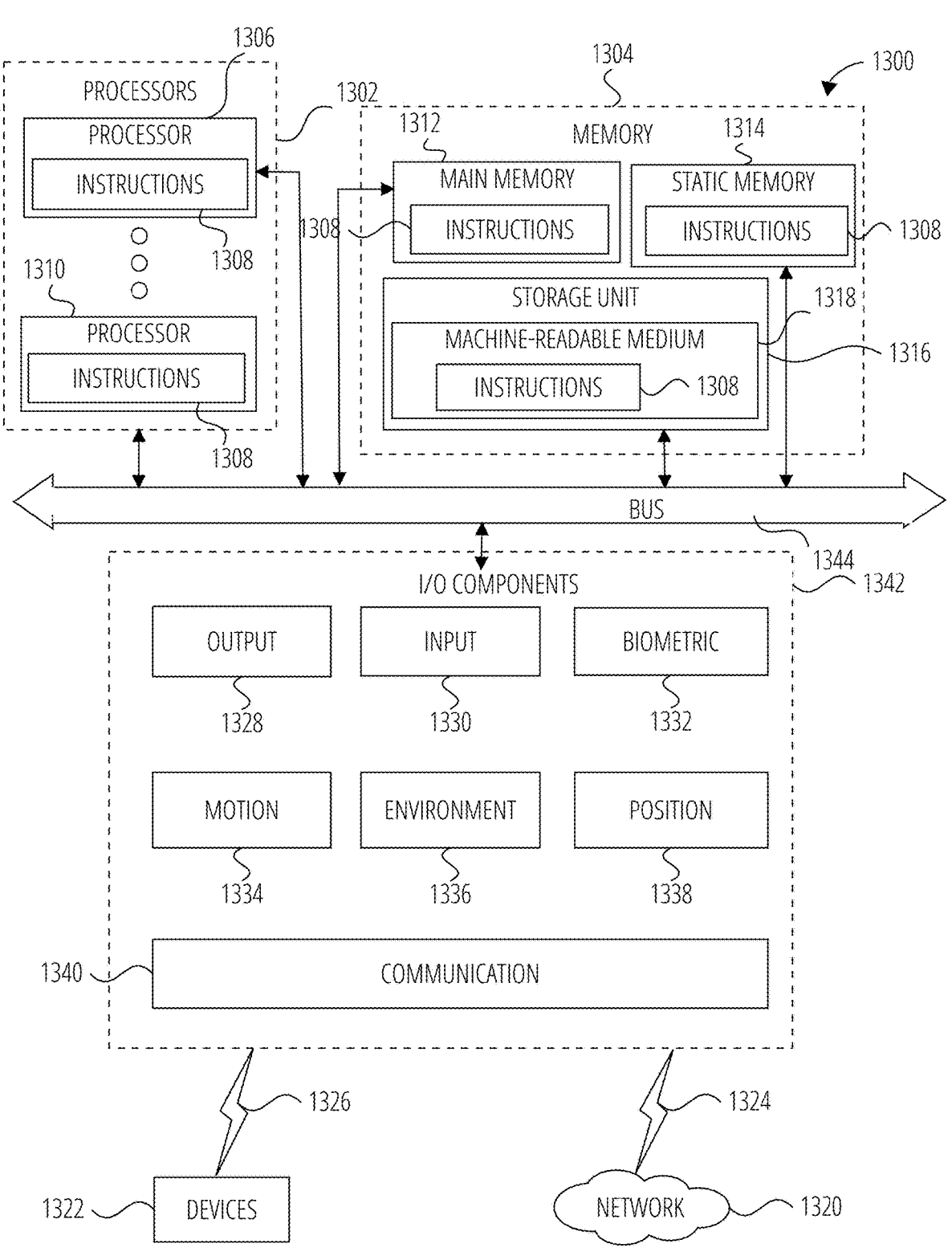
FIG. 13 is a diagrammatic representation of a machine in the form of a computer system within which a set of instructions may be executed for causing the machine to perform any one or more of the methodologies discussed herein, according to one example embodiment.

FIG. 13 is a diagrammatic representation of the machine 1300 within which instructions 1308 (e.g., software, a program, an application, an applet, an app, or other executable code) for causing the machine 1300 to perform any one or more of the methodologies discussed herein may be executed. For example, the instructions 1308 may cause the machine 1300 to execute any one or more of the methods described herein. The instructions 1308 transform the general, non-programmed machine 1300 into a particular machine 1300 programmed to carry out the described and illustrated functions in the manner described. The machine 1300 may operate as a standalone device or may be coupled (e.g., networked) to other machines. In a networked deployment, the machine 1300 may operate in the capacity of a server machine or a client machine in a server-client network environment, or as a peer machine in a peer-to-peer (or distributed) network environment. The machine 1300 may comprise, but not be limited to, a server computer, a client computer, a personal computer (PC), a tablet computer, a laptop computer, a netbook, a set-top box (STB), a PDA, an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1308, sequentially or otherwise, that specify actions to be taken by the machine 1300. Further, while only a single machine 1300 is illustrated, the term "machine" shall also be taken to include a collection of machines that individually or jointly execute the instructions 1308 to perform any one or more of the methodologies discussed herein.

The machine 1300 may include Processors 1302, memory 1304, and I/O Components 1342, which may be configured to communicate with each other via a bus 1344. In an example embodiment, the Processors 1302 (e.g., a Central Processing Unit (CPU), a Reduced Instruction Set Computing (RISC) Processor, a Complex Instruction Set Computing (CISC) Processor, a Graphics Processing Unit (GPU), a Digital Signal Processor (DSP), an ASIC, a Radio-Frequency Integrated Circuit (RFIC), another Processor, or any suitable combination thereof) may include, for example, a Processor 1306 and a Processor 1310 that execute the instructions 1308. The term "Processor" is intended to include multi-core Processors that may comprise two or more independent Processors (sometimes referred to as "cores") that may execute instructions contemporaneously. Although FIG. 13 shows multiple Processors 1302, the machine 1300 may include a single Processor with a single core, a single Processor with multiple cores (e.g., a multi-core Processor), multiple Processors with a single core, multiple Processors with multiples cores, or any combination thereof.

The memory 1304 includes a main memory 1312, a static memory 1314, and a storage unit 1316, both accessible to the Processors 1302 via the bus 1344. The main memory 1304, the static memory 1314, and storage unit 1316 store the instructions 1308 embodying any one or more of the methodologies or functions described herein. The instructions 1308 may also reside, completely or partially, within the main memory 1312, within the static memory 1314, within machine-readable medium 1318 within the storage unit 1316, within at least one of the Processors 1302 (e.g., within the Processor's cache memory), or any suitable combination thereof, during execution thereof by the machine 1300.

The I/O Components 1342 may include a wide variety of Components to receive input, provide output, produce output, transmit information, exchange information, capture measurements, and so on. The specific I/O Components 1342 that are included in a particular machine will depend on the type of machine. For example, portable machines such as mobile phones may include a touch input device or other such input mechanisms, while a headless server machine will likely not include such a touch input device. It will be appreciated that the I/O Components 1342 may include many other Components that are not shown in FIG. 13. In various example embodiments, the I/O Components 1342 may include output Components 1328 and input Components 1330. The output Components 1328 may include visual Components (e.g., a display such as a plasma display panel (PDP), a light emitting diode (LED) display, a liquid crystal display (LCD), a projector, or a cathode ray tube (CRT)), acoustic Components (e.g., speakers), haptic Components (e.g., a vibratory motor, resistance mechanisms), other signal generators, and so forth. The input Components 1330 may include alphanumeric input Components (e.g., a keyboard, a touch screen configured to receive alphanumeric input, a photo-optical keyboard, or other alphanumeric input Components), point-based input Components (e.g., a mouse, a touchpad, a trackball, a joystick, a motion sensor, or another pointing instrument), tactile input Components (e.g., a physical button, a touch screen that provides location and/or force of touches or touch gestures, or other tactile input Components), audio input Components (e.g., a microphone), and the like.

In further example embodiments, the I/O Components 1342 may include biometric Components 1332, motion Components 1334, environmental Components 1336, or position Components 1338, among a wide array of other Components. For example, the biometric Components 1332 include Components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion Components 1334 include acceleration sensor Components (e.g., accelerometer), gravitation sensor Components, rotation sensor Components (e.g., gyroscope), and so forth. The environmental Components 1336 include, for example, illumination sensor Components (e.g., photometer), temperature sensor Components (e.g., one or more thermometers that detect ambient temperature), humidity sensor Components, pressure sensor Components (e.g., barometer), acoustic sensor Components (e.g., one or more microphones that detect background noise), proximity sensor Components (e.g., infrared sensors that detect nearby objects), gas sensors (e.g., gas detection sensors to detection concentrations of hazardous gases for safety or to measure pollutants in the atmosphere), or other Components that may provide indications, measurements, or signals corresponding to a surrounding physical environment. The position Components 1338 include location sensor Components (e.g., a GPS receiver Component), altitude sensor Components (e.g., altimeters or barometers that detect air pressure from which altitude may be derived), orientation sensor Components (e.g., magnetometers), and the like.

Communication may be implemented using a wide variety of technologies. The I/O Components 1342 further include communication Components 1340 operable to couple the machine 1300 to a network 1320 or devices 1322 via a coupling 1324 and a coupling 1326, respectively. For example, the communication Components 1340 may include a network interface Component or another suitable device to interface with the network 1320. In further examples, the communication Components 1340 may include wired communication Components, wireless communication Components, cellular communication Components, Near Field Communication (NFC) Components, Bluetooth® Components (e.g., Bluetooth® Low Energy), Wi-Fi® Components, and other communication Components to provide communication via other modalities. The devices 1322 may be another machine or any of a wide variety of peripheral devices (e.g., a peripheral device coupled via a USB).

Moreover, the communication Components 1340 may detect identifiers or include Components operable to detect identifiers. For example, the communication Components 1340 may include Radio Frequency Identification (RFID) tag reader Components, NFC smart tag detection Components, optical reader Components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection Components (e.g., microphones to identify tagged audio signals). In addition, a variety of information may be derived via the communication Components 1340, such as location via Internet Protocol (IP) geolocation, location via Wi-Fi® signal triangulation, location via detecting an NFC beacon signal that may indicate a particular location, and so forth.

The various memories (e.g., memory 1304, main memory 1312, static memory 1314, and/or memory of the Processors 1302) and/or storage unit 1316 may store one or more sets of instructions and data structures (e.g., software) embodying or used by any one or more of the methodologies or functions described herein. These instructions (e.g., the instructions 1308), when executed by Processors 1302, cause various operations to implement the disclosed embodiments.

The instructions 1308 may be transmitted or received over the network 1320, using a transmission medium, via a network interface device (e.g., a network interface Component included in the communication Components 1340) and using any one of a number of well-known transfer protocols (e.g., hypertext transfer protocol (HTTP)). Similarly, the instructions 1308 may be transmitted or received using a transmission medium via the coupling 1326 (e.g., a peer-to-peer coupling) to the devices 1322.

Although an embodiment has been described with reference to specific example embodiments, it will be evident that various modifications and changes may be made to these embodiments without departing from the broader scope of the present disclosure. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

EXAMPLES

Example 1 is a method for minimizing latency of moving objects comprising: determining an initial pose of a visual tracking device; identifying an initial location of an object in an image that is generated by an optical sensor of the visual tracking device, the image corresponding to the initial pose of the visual tracking device, rendering virtual content based on the initial pose and the initial location of the object; retrieving an updated pose of the visual tracking device; tracking an updated location of the object in an updated image that corresponds to the updated pose; and applying a time warp transformation to the rendered virtual content based on the updated pose and the updated location of the object to generate transformed virtual content.

Example 2 includes the method of example 1, further comprising: generating, using an AR application of the visual tracking device, the virtual content; rendering the virtual content using a rendering engine of a graphical processing unit at the virtual tracking device; and displaying the transformed virtual content in a display of the visual tracking device.

Example 3 includes the method of example 1, wherein the object comprises a face, a body part, or a physical object.

Example 4 includes the method of example 1, wherein the object comprises an animated virtual object, wherein identifying the initial location of the object in the image instead comprises identifying an initial location of the animated virtual object based on an animation behavior of the animated virtual object, wherein retrieving the updated location of the object further comprises tracking an updated location of the animated virtual object based on the animation behavior of the animated virtual object and the updated pose.

Example 5 includes the method of example 4, wherein the animation behavior describes a predefined motion path of the virtual object.

Example 6 includes the method of example 1, wherein retrieving the updated pose of the visual tracking device is based on inertial sensor data of the visual tracking device.

Example 7 includes the method of example 6, wherein the inertial sensor data comprises angular velocity data of the visual tracking device between the initial pose and the updated pose.

Example 8 includes the method of example 1, wherein the object comprises a first virtual object and a second virtual object, wherein identifying the initial location of the object further comprises: identifying an initial location of the first virtual object; and identifying an initial location of the second virtual object, wherein rendering the virtual content further comprises: rendering a first layer of virtual content based on the pose and the initial location of the first virtual object; and rendering a second layer of virtual content based on the pose and the initial location of the second virtual object, wherein retrieving the updated location of the object further comprises: identifying an updated location of the first virtual object based on the updated pose and a first animation behavior of the first virtual object; and identifying an updated location of the second virtual object based on the updated pose and a second animation behavior of the second virtual object.

Example 9 includes the method of example 8, wherein applying the time warp transformation to the rendered virtual content further comprises: applying the time warp transformation to the first layer; applying the time warp transformation to the second layer; and combining the first layer and the second layer in a single rendered frame.

Example 10 includes the method of example 9, further comprising: displaying the single rendered frame in a display of the visual tracking device.

Example 11 is a computing apparatus comprising: a processor; and a memory storing instructions that, when executed by the processor, configure the apparatus to perform operations comprising: determine an initial pose of a visual tracking device; identify an initial location of an object in an image that is generated by an optical sensor of the visual tracking device, the image corresponding to the initial pose of the visual tracking device, render virtual content based on the initial pose and the initial location of the object; retrieve an updated pose of the visual tracking device; track an updated location of the object in an updated image that corresponds to the updated pose; and apply a time warp transformation to the rendered virtual content based on the updated pose and the updated location of the object to generate transformed virtual content.

Example 12 includes the computing apparatus of example 11, wherein the instructions further configure the apparatus to: generate, using an AR application of the visual tracking device, the virtual content; render the virtual content using a rendering engine of a graphical processing unit at the virtual tracking device; and display the transformed virtual content in a display of the visual tracking device.

Example 13 includes the computing apparatus of example 11, wherein the object comprises a face, a body part, or a physical object.

Example 14 includes the computing apparatus of example 11, wherein the object comprises an animated virtual object, wherein identifying the initial location of the object in the image instead comprises identify an initial location of the animated virtual object based on an animation behavior of the animated virtual object, wherein retrieving the updated location of the object further comprises track an updated location of the animated virtual object based on the animation behavior of the animated virtual object and the updated pose.

Example 15 includes the computing apparatus of example 14, wherein the animation behavior describes a predefined motion path of the virtual object.

Example 16 includes the computing apparatus of example 11, wherein retrieving the updated pose of the visual tracking device is based on inertial sensor data of the visual tracking device.

Example 17 includes the computing apparatus of example 16, wherein the inertial sensor data comprises angular velocity data of the visual tracking device between the initial pose and the updated pose.

Example 18 includes the computing apparatus of example 11, wherein the object comprises a first virtual object and a second virtual object, wherein identifying the initial location of the object further comprises: identify an initial location of the first virtual object; and identify an initial location of the second virtual object, wherein rendering the virtual content further comprises: render a first layer of virtual content based on the pose and the initial location of the first virtual object; and render a second layer of virtual content based on the pose and the initial location of the second virtual object, wherein retrieving the updated location of the object further comprises: identify an updated location of the first virtual object based on the updated pose and a first animation behavior of the first virtual object; and identify an updated location of the second virtual object based on the updated pose and a second animation behavior of the second virtual object.

Example 19 includes the computing apparatus of example 18, wherein applying the time warp transformation to the rendered virtual content further comprises: apply the time warp transformation to the first layer; apply the time warp transformation to the second layer; combine the first layer and the second layer in a single rendered frame; and display the single rendered frame in a display of the visual tracking device.

Example 20 is a non-transitory computer-readable storage medium, the computer-readable storage medium including instructions that when executed by a computer, cause the computer to: determine an initial pose of a visual tracking device; identify an initial location of an object in an image that is generated by an optical sensor of the visual tracking device, the image corresponding to the initial pose of the visual tracking device, render virtual content based on the initial pose and the initial location of the object; retrieve an updated pose of the visual tracking device; track an updated location of the object in an updated image that corresponds to the updated pose; and apply a time warp transformation to the rendered virtual content based on the updated pose and the updated location of the object to generate transformed virtual content.

What is claimed is:

1. A method comprising:
rendering a first layer of virtual content based on a first pose of a visual tracking device and a first location of a first object depicted in a first image generated by an optical sensor of the visual tracking device;
rendering a second layer of virtual content based on the first pose of the visual tracking device and a first location of a second object depicted in the first image;
accessing a second pose of the visual tracking device;
determining a second location of the first object in a second image that corresponds to the second pose;

determining a second location of the second object in the second image;
applying a first time warp transformation to the first layer based on a combination of the second pose and the second location of the first object;
applying a second time warp transformation to the second layer based on a combination of the second pose and the second location of the second object; and
generating transformed virtual content by combining the first layer and the second layer in a single rendered frame.

2. The method of claim 1, further comprising:
generating, using an augmented reality application of the visual tracking device, the virtual content;
rendering the virtual content using a rendering engine of a graphical processing unit at the visual tracking device; and
displaying the transformed virtual content in a display of the visual tracking device.

3. The method of claim 1, wherein the first object comprises a physical object or a virtual object.

4. The method of claim 1, wherein the first object comprises an animated virtual object,
wherein the first location of the first object is based on an animation behavior of the animated virtual object,
wherein the second location of the first object is based on the animation behavior of the animated virtual object and the second pose.

5. The method of claim 4, wherein the animation behavior describes a predefined motion path of the animated virtual object.

6. The method of claim 1, wherein the first pose of the visual tracking device are based on inertial sensor data of the visual tracking device.

7. The method of claim 6, wherein the inertial sensor data comprises angular velocity data of the visual tracking device between the first pose and the second pose.

8. The method of claim 1, wherein the first object comprises a first virtual object and the second object comprises a second virtual object,
wherein determining the second location of the first object is based on the second pose and a first animation behavior of the first virtual object,
wherein determining the second location of the second object is based on the second pose and a second animation behavior of the second virtual object.

9. The method of claim 8, wherein determining the second location of the first object further comprises accessing a first animation configuration setting of the first virtual object, wherein determining the second location of the second object further comprises accessing a second animation configuration setting of the second virtual object.

10. The method of claim 1, further comprising:
determining the first pose of the visual tracking device of an augmented reality device that comprises the optical sensor;
accessing the first image generated by the optical sensor, the first image corresponding to the first pose of the visual tracking device; and
determining the second pose of the visual tracking device, the second pose following the first pose,
wherein the first object is stationary or non-stationary and the second object is non-stationary or stationary.

11. A computing apparatus comprising:

a processor; and a memory storing instructions that, when executed by the processor, configure the apparatus to perform operations comprising:

rendering a first layer of virtual content based on a first pose of a visual tracking device and a first location of a first object depicted in a first image generated by an optical sensor of the visual tracking device;

rendering a second layer of virtual content based on the first pose of the visual tracking device and a first location of a second object depicted in the first image;

accessing a second pose of the visual tracking device;

determining a second location of the first object in a second image that corresponds to the second pose;

determining a second location of the second object in the second image;

applying a first time warp transformation to the first layer based on a combination of the second pose and the second location of the first object;

applying a second time warp transformation to the second layer based on a combination of the second pose and the second location of the second object; and generating transformed virtual content by combining the first layer and the second layer in a single rendered frame.

12. The computing apparatus of claim 11, wherein the operations further comprise:

generating, using an augmented reality application of the visual tracking device, the virtual content;

rendering the virtual content using a rendering engine of a graphical processing unit at the visual tracking device; and displaying the transformed virtual content in a display of the visual tracking device.

13. The computing apparatus of claim 11, wherein the first object comprises a physical object or a virtual object.

14. The computing apparatus of claim 11, wherein the first object comprises an animated virtual object, wherein the first location of the first object is based on an animation behavior of the animated virtual object, wherein the second location of the first object is based on the animation behavior of the animated virtual object and the second pose.

15. The computing apparatus of claim 14, wherein the animation behavior describes a predefined motion path of the animated virtual object.

16. The computing apparatus of claim 11, wherein the first pose of the visual tracking device are based on inertial sensor data of the visual tracking device.

17. The computing apparatus of claim 16, wherein the inertial sensor data comprises angular velocity data of the visual tracking device between the first pose and the second pose.

18. The computing apparatus of claim 11, wherein the first object comprises a first virtual object and the second object comprises a second virtual object, wherein determining the second location of the first object is based on the second pose and a first animation behavior of the first virtual object, wherein determining the second location of the second object is based on the second pose and a second animation behavior of the second virtual object.

19. The computing apparatus of claim 18, wherein determining the second location of the first object further comprises accessing a first animation configuration setting of the first virtual object, wherein determining the second location of the second object further comprises accessing a second animation configuration setting of the second virtual object.

20. A non-transitory computer-readable storage medium, the computer-readable storage medium including instructions that when executed by a computer, cause the computer to perform operations comprising:

rendering a first layer of virtual content based on a first pose of a visual tracking device and a first location of a first object depicted in a first image generated by an optical sensor of the visual tracking device;

rendering a second layer of virtual content based on the first pose of the visual tracking device and a first location of a second object depicted in the first image;

accessing a second pose of the visual tracking device;

determining a second location of the first object in a second image that corresponds to the second pose;

determining a second location of the second object in the second image;

applying a first time warp transformation to the first layer based on a combination of the second pose and the second location of the first object;

applying a second time warp transformation to the second layer based on a combination of the second pose and the second location of the second object; and generating transformed virtual content by combining the first layer and the second layer in a single rendered frame.

\* \* \* \* \*